United States Patent
Ataman et al.

(10) Patent No.: US 12,339,003 B2
(45) Date of Patent: Jun. 24, 2025

(54) GAS TURBINE ENGINE AND FUEL NOZZLE THEREFOR

(71) Applicants: GE Marmara Technology Center Muhendislik Hizmetleri Ltd, Gebze (TR); GENERAL ELECTRIC COMPANY, Schenectady, NY (US)

(72) Inventors: Volkan Ataman, Istanbul (TR); Fatih Yasar, Istanbul (TR); Emrah Deniz, Istanbul (TR); Michael T. Bucaro, Arvada, CO (US)

(73) Assignees: GE Marmara Technology Center Muhendislik Hizmetleri Ltd, Gebze (TR); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/469,174

(22) Filed: Sep. 18, 2023

(65) Prior Publication Data
US 2025/0093031 A1   Mar. 20, 2025

(51) Int. Cl.
F23R 3/28 (2006.01)
F02C 7/22 (2006.01)
F23R 3/00 (2006.01)

(52) U.S. Cl.
CPC ............ *F23R 3/28* (2013.01); *F02C 7/22* (2013.01); *F23R 3/002* (2013.01)

(58) Field of Classification Search
CPC .. F23R 3/283; F23R 3/28; F23R 3/002; F23R 3/60; F02C 7/22; F02C 7/222
See application file for complete search history.

(56) References Cited

U.S. PATENT DOCUMENTS

| | | | |
|---|---|---|---|
| 2,616,258 A | 11/1952 | Mock | |
| 3,516,252 A | 6/1970 | Udell | |
| 4,466,240 A | 8/1984 | Miller | |
| 4,938,019 A | 7/1990 | Angell et al. | |
| 5,253,810 A * | 10/1993 | Maltby | F23D 11/38 239/132.3 |
| 5,279,112 A | 1/1994 | Halila | |
| 5,328,102 A | 7/1994 | Babitzka et al. | |
| 5,771,696 A * | 6/1998 | Hansel | F23D 23/00 60/746 |
| 6,250,062 B1 | 6/2001 | Lawen, Jr. et al. | |
| 6,354,085 B1 * | 3/2002 | Howell | F23R 3/283 60/740 |
| 9,714,767 B2 | 7/2017 | Stewart et al. | |

(Continued)

FOREIGN PATENT DOCUMENTS

CN  217526000 U  10/2022
EP  3428537 B1  11/2022

(Continued)

*Primary Examiner* — Alain Chau
*Assistant Examiner* — Roberto Toshiharu Igue
(74) *Attorney, Agent, or Firm* — Carter, DeLuca & Farrell, LLP; George Likourezos; Francesco Sardone

(57) ABSTRACT

A gas turbine engine comprising a combustion section enshrouded by a casing having at least one through passage, the combustion section comprising a dome wall and a liner at least partially defining a combustion chamber; a fuel nozzle connected to the dome wall and having a nozzle tube; and a coupling securing the fuel nozzle with casing and disposed at least partially in the at least one through passage.

20 Claims, 16 Drawing Sheets

(56) References Cited

U.S. PATENT DOCUMENTS

| | | |
|---|---|---|
| 11,255,370 B2 | 2/2022 | Pinney |
| 2007/0137218 A1* | 6/2007 | Prociw .................... F23R 3/283 60/740 |
| 2014/0245740 A1 | 9/2014 | Wiebe |
| 2015/0000283 A1 | 1/2015 | Ramier |

FOREIGN PATENT DOCUMENTS

| | | |
|---|---|---|
| WO | 2015/039832 A1 | 3/2015 |
| WO | 2017/018992 A1 | 2/2017 |

* cited by examiner

GAS TURBINE ENGINE AND FUEL NOZZLE THEREFOR

TECHNICAL FIELD

The present subject matter relates generally to a gas turbine engine having a fuel nozzle.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
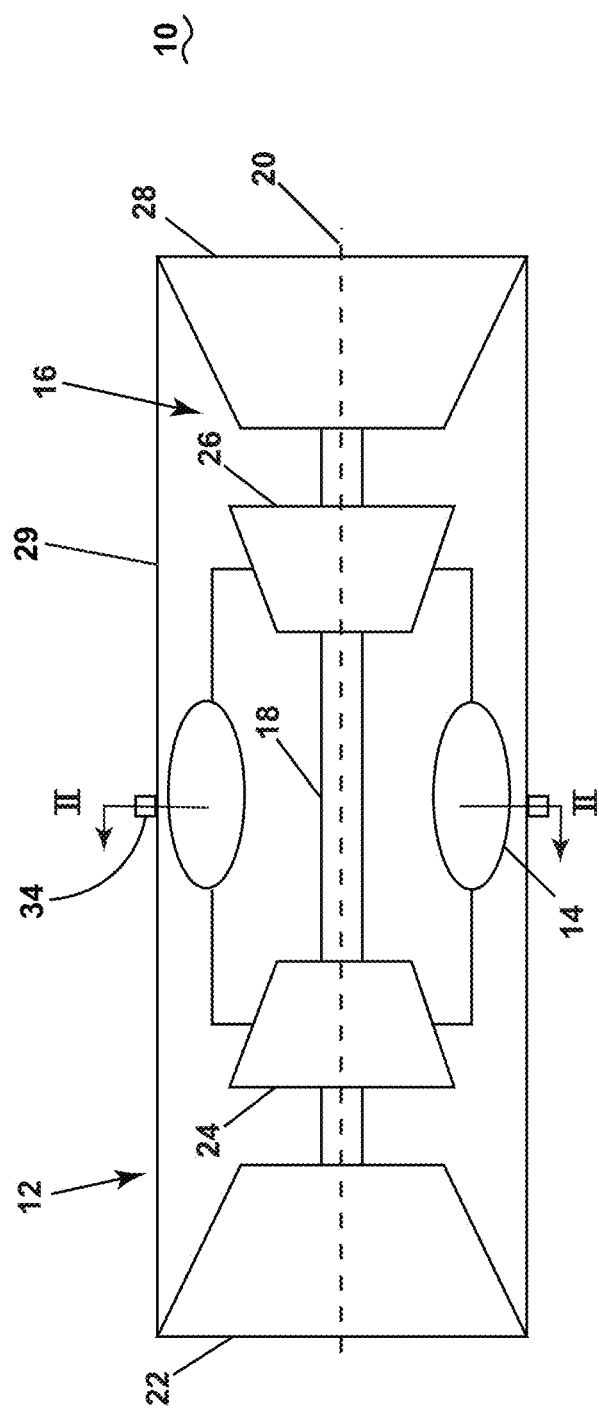
FIG. 1 is a schematic cross-sectional view of a turbine engine having a compression section, a combustion section, and a turbine section in accordance with various aspects described herein.

Aspects of the disclosure described herein are directed to a combustor. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. In the context of a coupling of a fuel nozzle, radial can refer to a direction along a ray extending between a centerline of the coupling or a shaft thereof and an outer circumference of the coupling.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is not limiting, rather a descriptor for locating parts described herein. Further, the term "proximate" means nearer or closer to the part recited than the following part. For example, a first hole proximate a wall, the first hole located upstream from a second hole means that the first hole is closer to the wall than the first hole is to the second hole.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about and enshroud one or more sections of the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
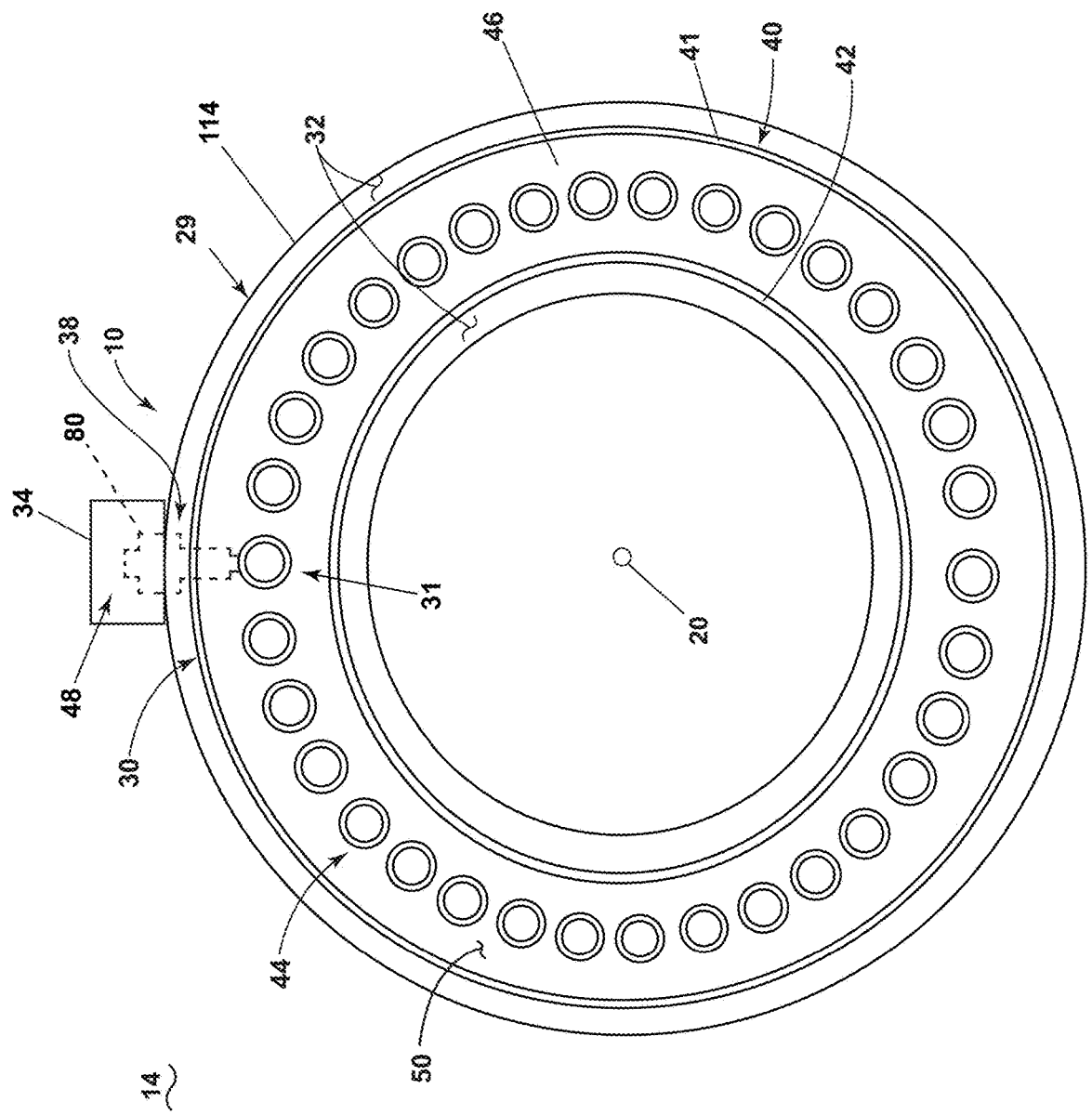
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustion section 14 can include a combustor 30 with an annular arrangement of combustor cups 31 disposed around the centerline or rotational axis 20 of the turbine engine 10. The combustor 30 can have a can, can-annular, or annular arrangement depending on the type of engine in which the combustor 30 is located. In a non-limiting example, the combustor 30 can have a combination arrangement located with a shroud or casing 29 of the engine 10. The shroud or casing 29 can enshroud or cover at least a portion of the combustion section 14.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. In some examples, the combustor liner 40 can have an annular structure about the combustor 30. In some examples, the combustor liner 40 can include multiple segments or portions collectively forming the combustor liner 40. In some examples, the combustor liner 40 can include the outer liner 41 radially spaced from the inner liner 42. In some examples, the combustor liner 40 can include a single liner.

A dome assembly 44 together with the combustor liner 40 can at least partially define a combustion chamber 50 arranged annularly about the rotational axis 20. For example, a dome wall 46 of the dome assembly 44 can be substantially perpendicular to the rotational axis 20 and can cooperate with the outer liner 41, the inner liner 42, or both, to at least partially define the combustion chamber 50. A compressed air passage 32 can be defined at least in part by both the combustor liner 40 and the casing 29.

The combustor 30 can include or is connected to a fuel supply 34 (e.g., an external fuel manifold). The fuel supply 34 can be connected to an outer surface 62 of the casing 29, which can be an opposite surface from an inner surface 60. A fuel nozzle 38 fluidly couples the fuel supply 34 with the combustor cups 31 and the combustion chamber 50. The fuel F can include any suitable fuel, including hydrocarbon fuel or hydrogen fuel in non-limiting examples. For example, the fuel nozzle 38 can be a hydrogen fuel nozzle and the fuel nozzle assembly 48 can be a hydrogen fuel nozzle assembly. The combustor cups 31 can be separately connected to the dome wall 46. For example and without limitation, the combustor cups 31 can be connected to the dome wall 46 in a circumferentially spaced configuration. The combustor cups 31 can be disposed at a radial distance from the rotational axis 20 that is greater than a radial distance of the inner liner 42 and less than a radial distance of the outer liner 41.

Figure 3:
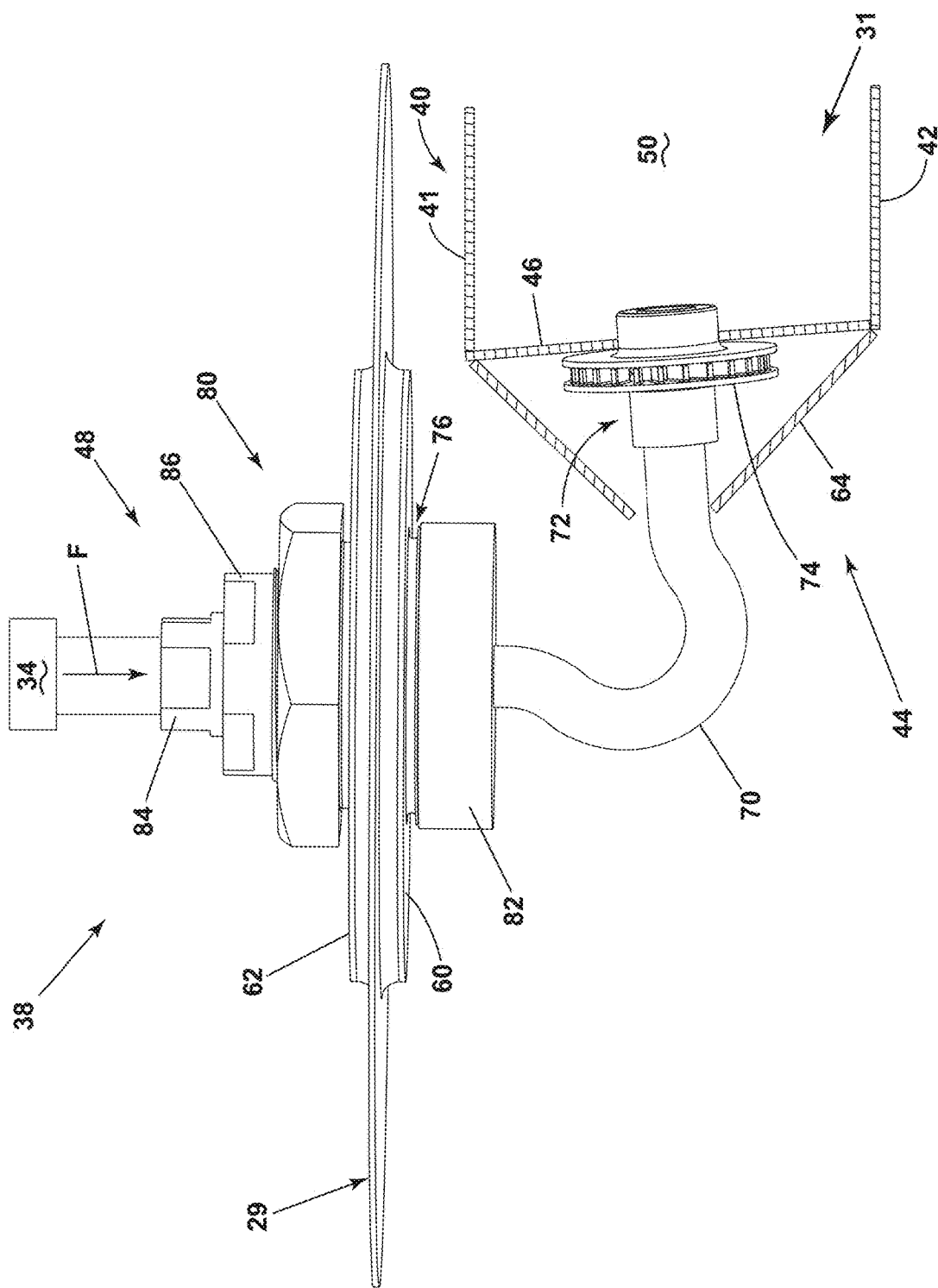
FIG. 3 is a schematic view illustrating portions of a fuel nozzle connected to a casing and a dome wall in accordance with various aspects described herein.

FIG. 3 depicts portions of a combustion section 14 of FIG. 1, including the fuel nozzle 38 secured to the combustion chamber 50 via a coupling 80. The fuel nozzle 38 can include a nozzle tube 70. The nozzle tube 70 can be fluidly coupled to the fuel supply 34. The nozzle tube 70 can provide fuel F received by the fuel nozzle 38 (e.g., from a fuel supply 34) to the combustion chamber 50. The nozzle tube 70 can include a nozzle tip 72 disposed at its distal end. The nozzle tip 72 can include one or more openings that allow fuel F to exit the fuel nozzle 38 and enter the combustion chamber 50. A fuel nozzle assembly 48 can include the fuel nozzle 38 and the coupling 80.

In an example aspect, the fuel nozzle 38 can include or be fluidly coupled with a swirler 74. The swirler 74 can be provided at or about the dome wall 46 and, in some instances, can extend into or through the dome wall 46. The swirler 74 can swirl incoming air, such as compressed air from the compressor section 12, in proximity of fuel F exiting the nozzle tip 72, which may facilitate a homogeneous mixture of air and fuel entering the combustor 30. In some configurations, the swirler 74 can be fixed (e.g., rigidly, permanently) to the dome wall 46. For example, the swirler 74 can be rigidly fixed to the dome wall 46 via welding, brazing, fasteners, or a combination thereof.

In some examples, a swirler 74 can be connected to and at least partially surround the nozzle tube 70 and the nozzle tip 72. For example, the nozzle tip 72 may extend into and through the swirler 74. With some configurations, the nozzle tube 70 can be rigidly fixed (e.g., bolted, brazed, welded, riveted, fastened, etc.) to the swirler 74 such that the fuel nozzle 38 is rigidly fixed to the swirler 74, the dome wall 46, or both. The swirler 74 may be rigidly fixed (e.g., bolted, brazed, welded, riveted, fastened, etc.) to the dome wall 46, which may provide a configuration in which the nozzle tip 72 and the swirler 74 are fixed to the dome wall 46 in a concentric arrangement, which may provide consistent flame distribution in the combustion chamber 50. In other designs, with floating connections between nozzles and dome walls, the nozzles can move, at least to some degree, relative to the dome wall, which can provide inconsistent flame distribution.

Some fuels, such as hydrogen, are particularly sensitive to interactions with oxidizers, so misalignment between two or more of the nozzle tip 72, the swirler 74, or the dome wall 46 could have significant and undesired effects on flame distribution. Fixing the nozzle tip 72, the swirler 74, and the dome wall 46 relative to each other in a proper alignment (e.g., with the nozzle tip 72 and the swirler 74 in a concentric configuration) may limit or eliminate such undesired effects on flame distribution.

A fuel nozzle 38 may provide fuel F to a combustor cup 31 via a single hole 76 (e.g., a through passage) in the casing 29. Other designs include a hole for fluid flow and a plurality of additional fastener holes for each nozzle. With some aspects of the current disclosure, the number of holes 76 in the casing 29 is reduced compared to such other designs. Some other designs may also include oversized casing holes to allow for removal of a nozzle from a casing. With the instant design, the casing 29 may not include any such oversized casing holes. For example, the casing hole 76 may be just large enough for the insertion and rotation of a second shaft 86 and may not be large enough for the whole fuel nozzle 38 to pass through (e.g., the flange 82 may not be capable of being passed through the casing hole 76).

According to an aspect of the present disclosure, a proximal end of the nozzle tube 70 can be connected to the coupling 80, which can be connected to the casing 29, the fuel supply 34, or both. The nozzle tip 72 can be connected at or about a distal end of the nozzle tube 70.

In some examples, the dome wall 46 can be substantially annular and substantially perpendicular to at least some portions of the casing 29, but the dome wall 46 can include other configurations. The nozzle tube 70 can include a generally L-shaped configuration. For example, a first section of the nozzle tube 70 may extend generally radially inward from the casing 29 and the fuel supply 34, and a second section of the nozzle tube 70 may extend generally axially from the first section toward the dome wall 46. The first section may be substantially perpendicular to the nozzle tip 72.

According to an aspect of the present disclosure, the dome assembly 44 can include an extension 64. The extension 64 can extend generally axially forward from the dome wall 46 and taper radially inward and may at least partially cover and enclose the fuel nozzle 38 and the swirler 74.

Figure 4:
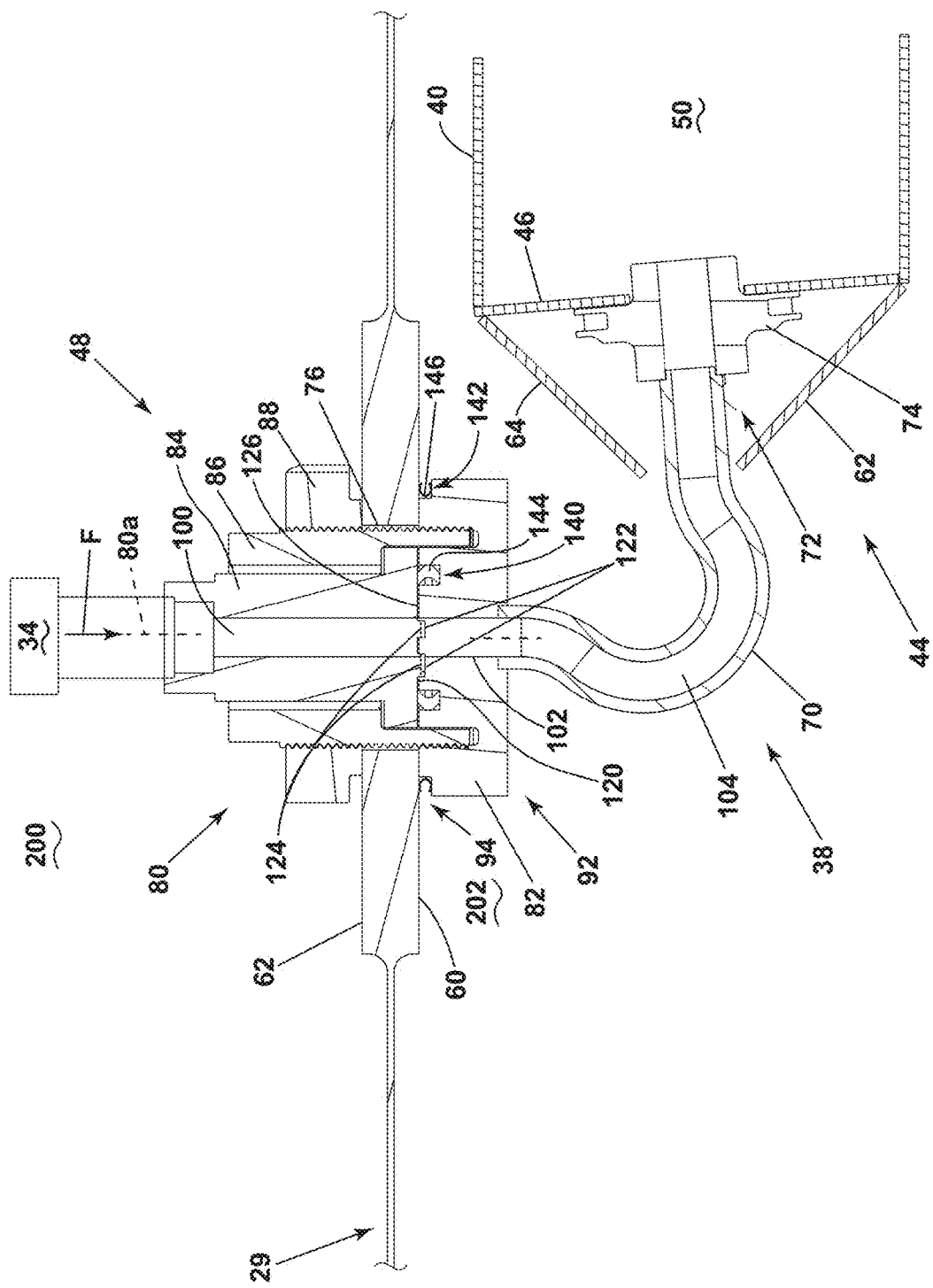
FIG. 4 is a schematic sectional view of the fuel nozzle of FIG. 3.

FIG. 4 depicts a cross-section of the fuel nozzle 38 connected to the casing 29 via the coupling 80. With some aspects, the coupling 80 can include a flange 82, a first shaft 84, a second shaft 86, and a nut 88. The flange 82 can be connected (e.g., rigidly fixed) to a proximal end of the nozzle tube 70. In an assembled configuration, the flange 82 can be adjacent to or in contact with the inner surface 60 of the casing 29. The first shaft 84 can be engaged with the flange 82 and extend through the casing hole 76 beyond the outer surface 62 of the casing 29 and fluidly couple the fuel nozzle 38, the coupling 80, or both to the fuel supply 34. The second shaft 86 can be disposed at least partially around the first shaft 84, extend through the casing hole 76, engage the flange 82, or a combination thereof. The nozzle tube 70 can be disposed at a first side 92 (e.g., an inner side) of the flange 82, and the nut 88 can be disposed at a second side 94 (e.g., an outer side) of the flange 82 that is opposite the first side 92. The nut 88 can engage the second shaft 86 and contact the outer surface 62 of the casing 29, such as to apply a clamping force to the casing 29 between the nut 88 and the flange 82 to fix the nozzle 38 with the casing 29. For example, the nut 88 may be disposed opposite the flange 82 with a portion of the casing 29 therebetween.

With some aspects, the first shaft 84 includes a first fluid passage 100, the flange 82 includes a second fluid passage 102, and the nozzle tube 70 includes a third fluid passage 104. In an assembled configuration, the first fluid passage 100 can be fluidly coupled with the fuel supply 34 and fluidly coupled with the second fluid passage 102. The second fluid passage 102 can be fluidly coupled with the third fluid passage 104, such as to provide fluid communication from the fuel supply 34 to the combustion chamber 50.

Figure 5:
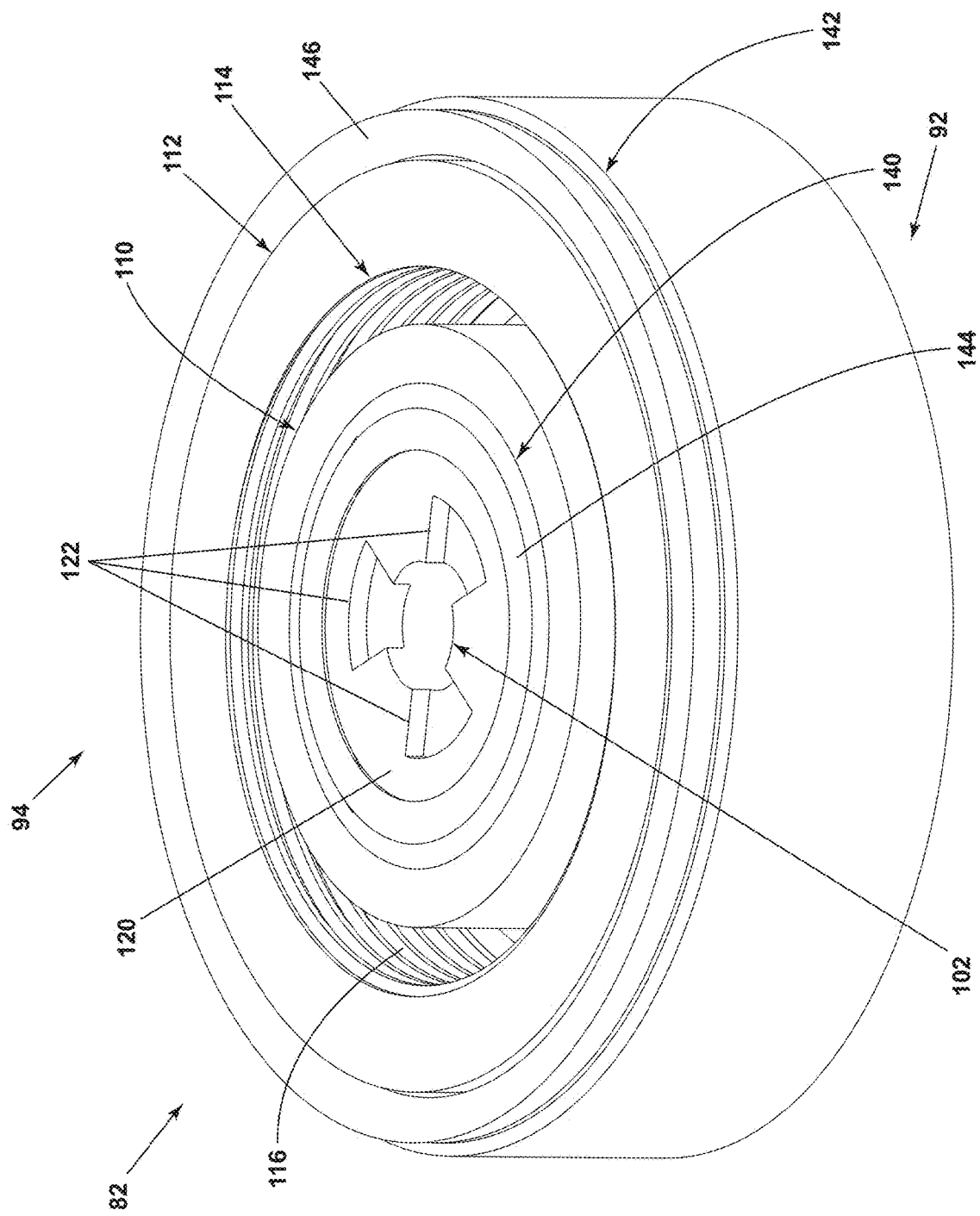
FIG. 5 is a perspective view of a flange of a coupling of a fuel nozzle in accordance with various aspects described herein.

FIG. 5 depicts an example of the flange 82. The flange 82 can include an inner portion 110 and an outer portion 112 that may be spaced (e.g., radially) from the inner portion 110 by a channel 114. The flange 82 can be cylindrical and the channel 114 can be annular. The channel 114 can include at least one threaded surface 116. The inner portion 110 can include an axial surface 120 that may face away from nozzle tube 70 (FIG. 4), toward the casing 29 (FIG. 4), or both. The axial surface 120 can include one or more axially-extending formations 122, such as one or more voids, one or more protrusions (e.g., teeth), or a combination thereof. The one or more formations 122 can be configured to engage corresponding formations 124 of a first axial surface 126 of the first shaft 84 (see, e.g., FIG. 4). For example, the formations 124 of the first shaft 84 can include complementary voids, protrusions (e.g., teeth), or both such that when the axial surface 120 of the flange 82 is engaged with the first axial surface 126 (FIG. 4) of the first shaft 84 (FIG. 4), the formations 122 are engaged with the formations 124 and relative rotation between the flange 82 and the first shaft 84 is restricted or prevented.

With some aspects, the flange 82 can include a first seal recess 140, a second seal recess 142, or both. The inner portion 110 can include the first seal recess 140. A first seal 144 can be disposed at least partially in the first seal recess 140, such as to provide a fluid seal between the flange 82 and the first shaft 84 (FIG. 4). A second seal 146 can be disposed at least partially in the second seal recess 142, such as to provide a fluid seal between the flange 82 and the inner surface 60 of the casing 29 (FIG. 4). The diameter of the first seal 144 can be smaller than the diameter of the casing hole 76, and the diameter of the second seal 146 can be larger than the diameter of the casing hole 76 (see, e.g., FIG. 4). The second seal 146 can, for example, be configured to restrict the flow of pressurized air inside the casing 29, such as in a space 202 (FIG. 4), from flowing through the casing hole 76 to a space 200 (FIG. 4) outside of the casing 29. In some configurations, the second seal 146 can include a C-seal. In some configurations, the second seal 146 can include a metallic seal, anon-metallic seal, or a combination of both.

Figure 6:
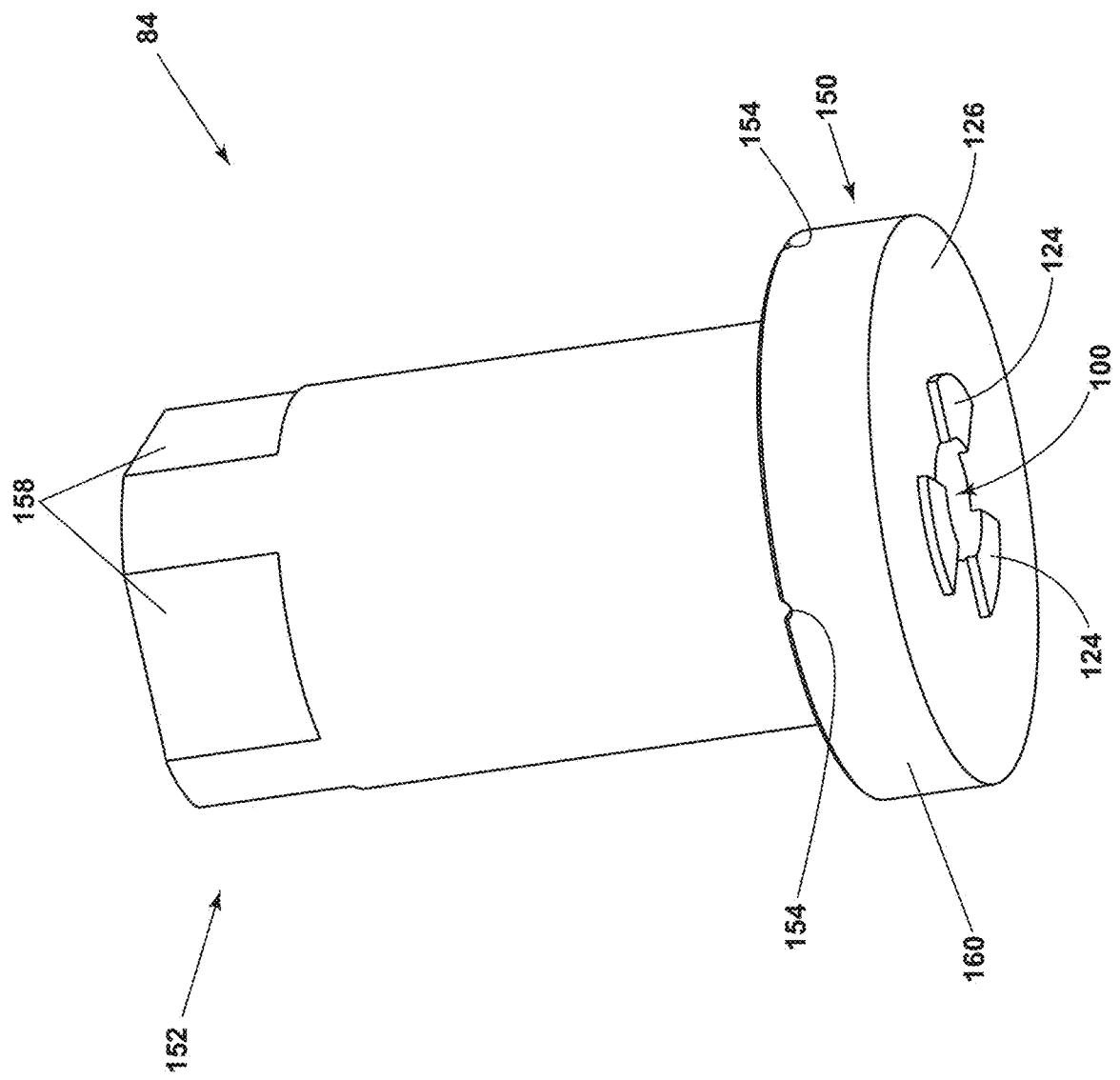
FIGS. 6 and 7 are perspective views of a first shaft of a coupling of a fuel nozzle in accordance with various aspects described herein.
Figure 7:
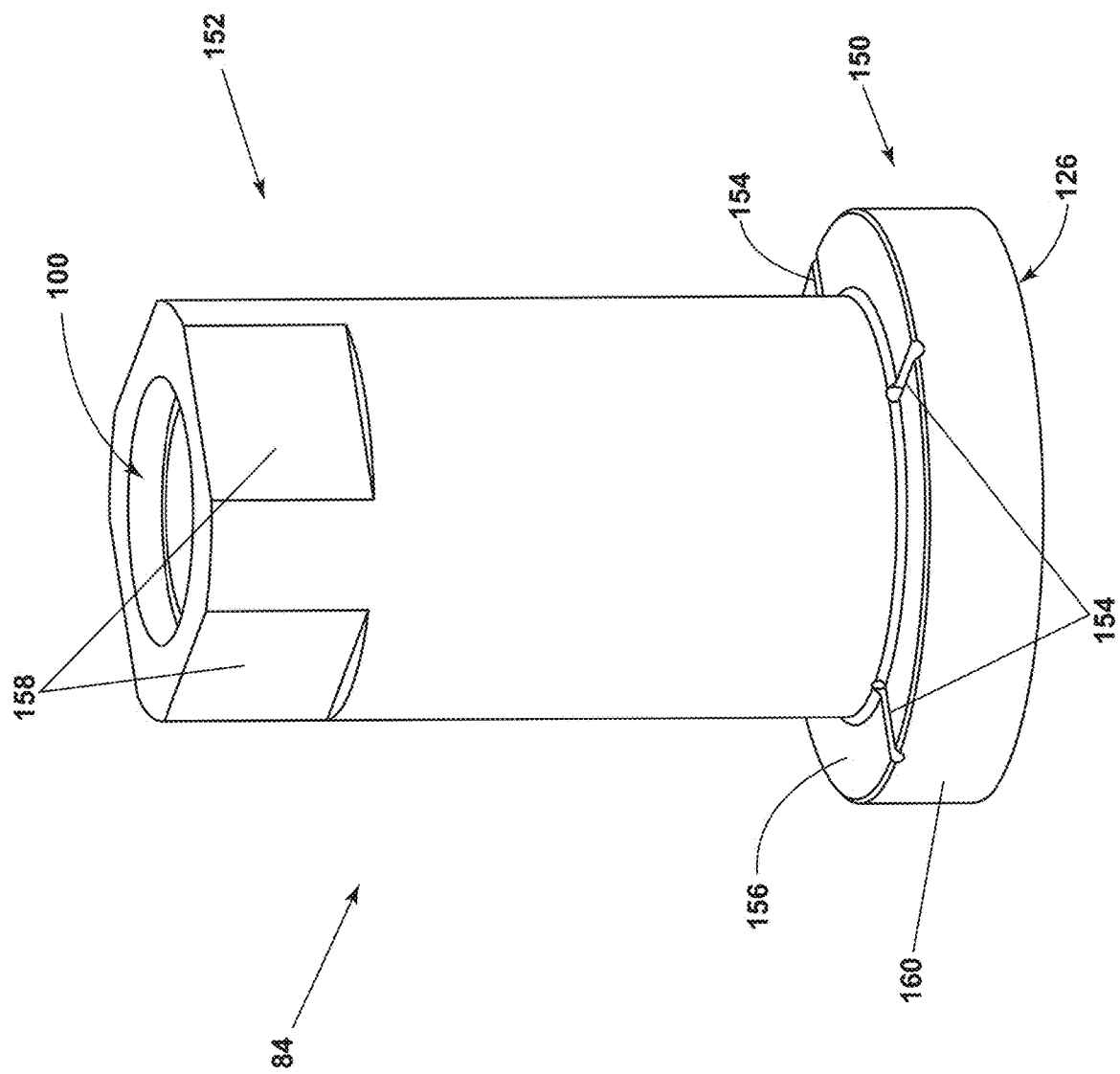

FIGS. 6 and 7 depict an example of the first shaft 84. A first axial end 150 of the first shaft 84 can include the first axial surface 126, which can include the formations 124. The first axial end 150 can include one or more leak channels 154 formed in a second axial surface 156 of the first shaft 84 that faces away from the flange 82. The one or more leak channels 154 can at least partially form a leak path LP (see, e.g., FIG. 9) for fluid that flows out of the first fluid passage 100 or the second fluid passage 102 (FIG. 5) and past the first seal 144 (FIG. 5) between the axial surface 120 (FIG. 5) of the flange 82 (FIG. 5) and the first axial surface 126 of the first shaft 84. A second axial end 152 of the first shaft 84 can include one or more flat portions 158, such as for applying torque or resisting the application of torque to the first shaft 84. The first axial end 150 can include a radial extension 160 having a larger diameter than the other portions of the first axial end 150, the second axial end 152, or both. The radial extension 160 can define the second axial surface 156 and may provide the outer radial surface of the first shaft 84 with a stepped configuration.

Figure 8:
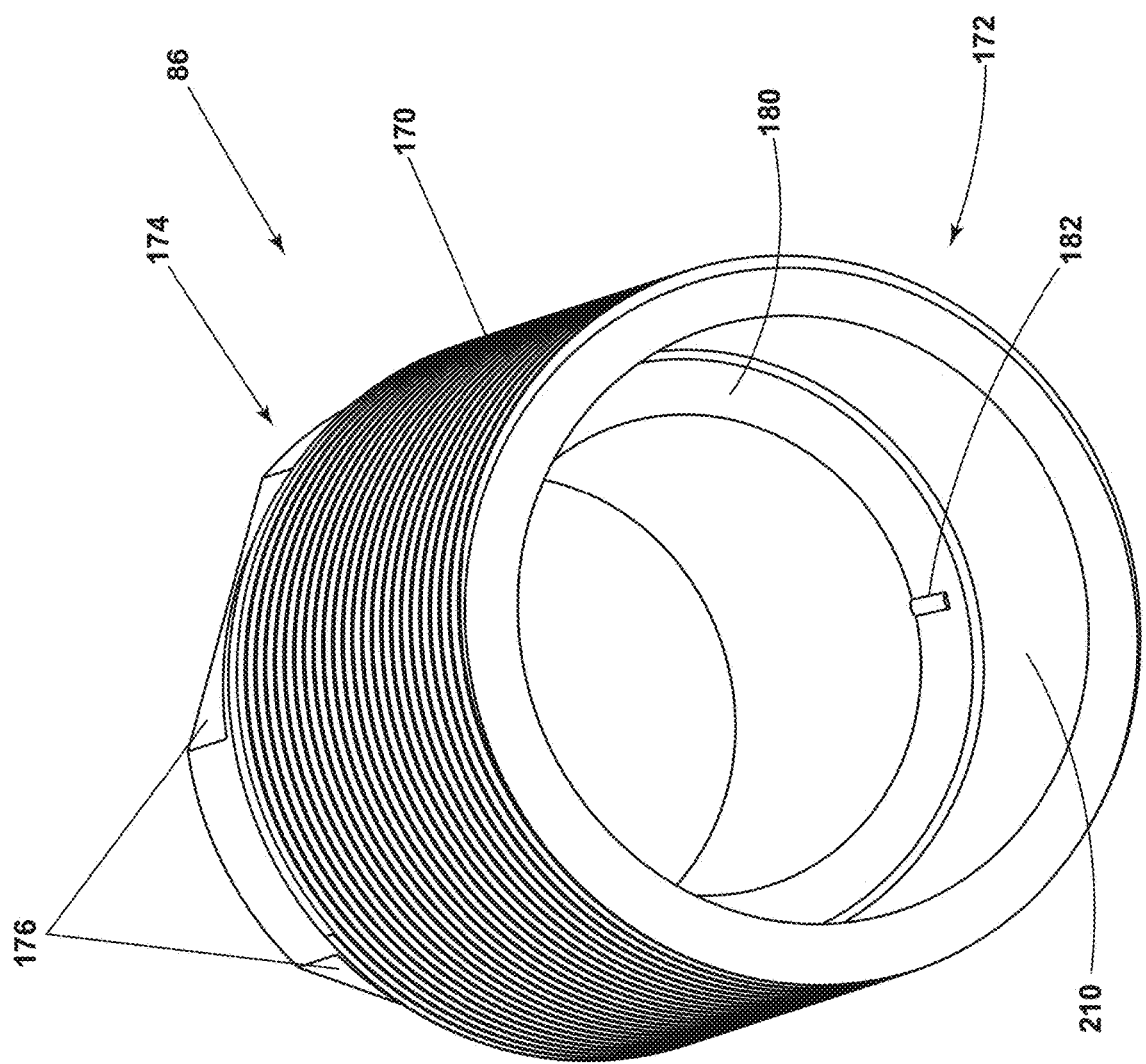
FIG. 8 is a perspective view of a second shaft of a coupling of a fuel nozzle in accordance with various aspects described herein.

FIG. 8 depicts an example of the second shaft 86. The second shaft 86 can include a threaded surface 170, which can be disposed at an outer radial surface of the second shaft 86. The threaded surface 170 can engage the threaded surface 116 (FIG. 5) of the flange 82 (FIG. 5). A first axial end 172 of the second shaft 86 can be inserted at least partially into the channel 114 (FIG. 5), such as when the threaded surface 170 of the second shaft 86 engages the threaded surface 116 of the flange 82 (FIG. 5). A second axial end 174 of the second shaft 86 can include one or more flat portions 176, such as for applying torque or resisting the application of torque to the second shaft 86. The second shaft 86 can include an inner axial surface 180 that can include one or more leak channels 182. The inner axial surface 180 can face toward the flange 82. The one or more leak channels 182 can at least partially form a leak path LP (see, e.g., FIG. 9) for fluid that flows out of the first fluid passage 100 (FIG. 4) or the second fluid passage 102 (FIG. 4) and past the first seal 144 (FIG. 5) between the axial surface 120 (FIG. 5) of the flange 82 and the first axial surface 126 (FIG. 6) of the first shaft 84 (FIG. 6). In some configurations, the leak channels 182 of the second shaft 86 can cooperate with the leak channels 154 (FIG. 6) of the first shaft 84 (FIG. 6). In other configurations, the leak channels 182 can function separately from and in addition to the leak channels 154 (FIG. 6), or instead of the leak channels 154. In an assembled configuration, the inner axial surface 180 of the second shaft 86 can be adjacent to, in contact with, or both, the second axial surface 156 (FIG. 7) of the first shaft 84. The first axial end 172 of the second shaft 86 can include a larger inner diameter than the second axial end 174, which may provide an inner surface 210 (e.g., an inner radial surface) of the second shaft 86 with a stepped configuration that can correspond to the stepped configuration of the first shaft 84 (FIG. 6). The inner axial surface 180 may extend radially between the larger inner diameter of the first axial end 172 and the smaller inner diameter of the second axial end 174.

Figure 9:
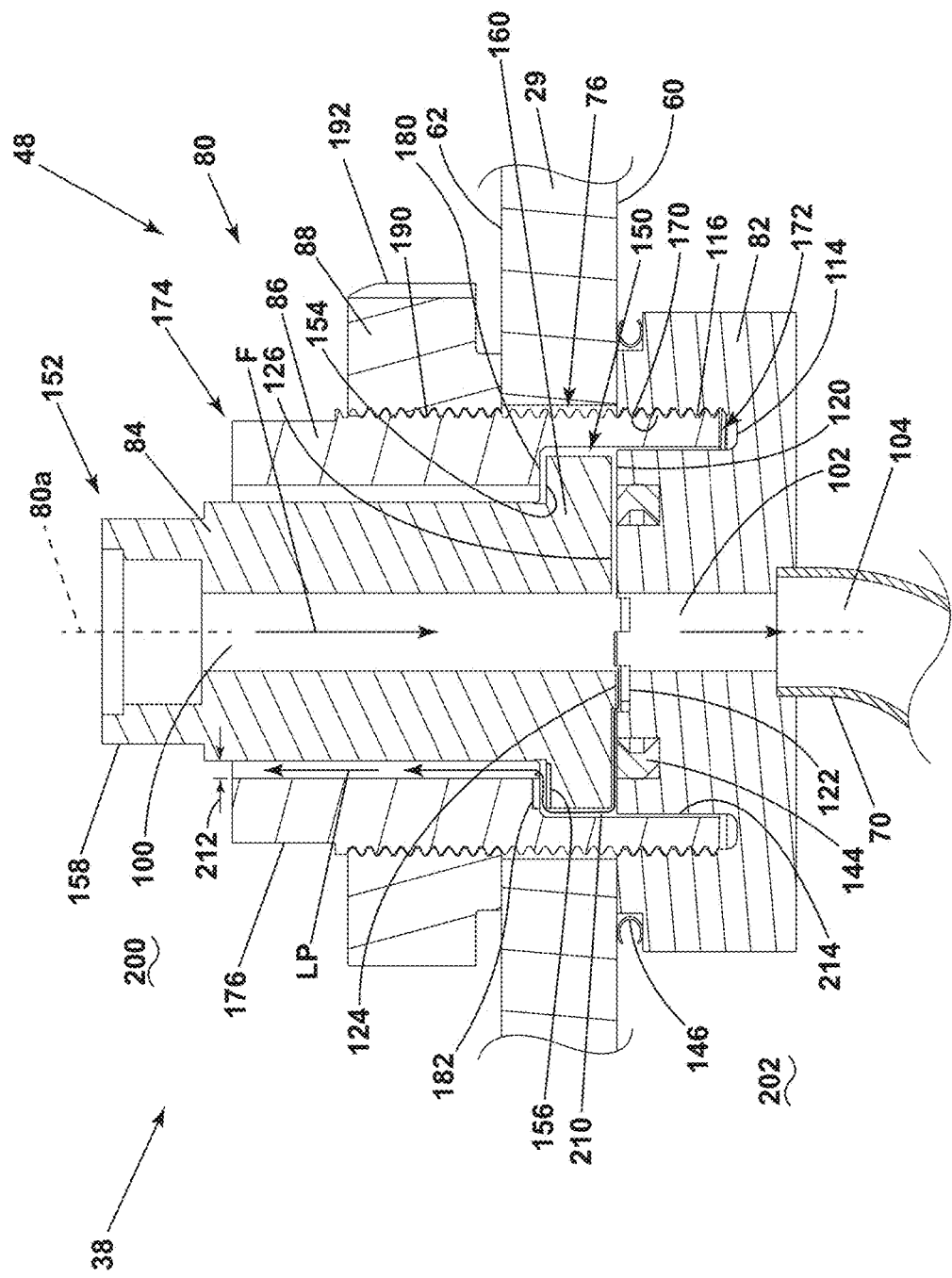
FIG. 9 is an enlarged sectional view of a coupling of a fuel nozzle connected to a casing in accordance with various aspects described herein.

FIG. 9 depicts an example of the coupling 80 in an assembled configuration with the casing 29. Assembling the fuel nozzle 38 and the coupling 80 with the casing 29 can include moving the flange 82 proximate the casing hole 76, which can include disposing the flange 82 adjacent or in contact with the inner surface 60 of the casing 29. Additionally or alternatively, moving the flange 82 proximate the casing hole 76 can include moving the second seal 146 adjacent or in contact with the inner surface 60. In some configurations, the flange 82 can be held adjacent or in contact with the inner surface 60 via a connection of the nozzle tube 70 with the dome wall 46 (see, e.g., FIGS. 3 and 4). For example, the nozzle tube 70 can be fixed (e.g., rigidly) to the dome wall 46 (FIG. 4) prior to completing assembly of the coupling 80 with the casing 29.

With some aspects, the first shaft 84 can be connected to the flange 82, which can include inserting the first shaft 84 at least partially into the casing hole 76, engaging one or more formations 122 of the flange 82 with one or more formations 124 of the first shaft 84, disposing the first axial surface 126 of the first shaft 84 in contact with the axial surface 120 of the flange 82, aligning the first fluid passage 100 with the second fluid passage 102, disposing the first axial surface 126 in contact with the first seal 144, or a combination thereof.

In some examples, after the first shaft 84 is connected to the flange 82, the second shaft 86 can be connected to the flange 82. Connecting the second shaft 86 to the flange 82 can include engaging the threaded surface 170 of the second shaft 86 with the threaded surface 116 of the flange 82, which can include inserting the first axial end 172 of the second shaft 86 at least partially into the channel 114 of the flange 82 (e.g., screwing the second shaft 86 into the flange 82). Additionally or alternatively, connecting the second shaft 86 to the flange 82 can clamp at least a portion of the first shaft 84 between the axial surface 120 of the flange 82 and the inner axial surface 180 of the second shaft 86. Clamping the first shaft 84 between the flange 82 and the second shaft 86 can, at least to some degree, compress or deform the first seal 144, such as to provide a fluid seal between the flange 82 and the first shaft 84. With some configurations, the first shaft 84 can be held in place, such as via applying a force or torque to the flat portions 158, while the second shaft 86 is connected to the flange 82, which can also hold the flange 82 in place, such as via engagement between the formations 122, 124. For example, holding the first shaft 84 in place can prevent rotational forces applied to the second shaft 86 (e.g., via flat portions 176) from being transferred to the flange 82 or the nozzle tube 70, such as to prevent damage to or misalignment of the nozzle tube 70, the dome wall 46 (FIG. 4), or both. Holding the flange 82 directly may not be feasible due to its position inside the casing 29 (e.g., insufficient room for tools, inaccessible, etc.).

With some examples, after the second shaft 86 is connected with the flange 82, the nut 88 can be connected to the second shaft 86. Connecting the nut 88 to the second shaft 86 can include engaging a threaded inner surface 190 of the nut 88 with the threaded surface 170 of the second shaft 86 (e.g., the nut 88 may be screwed onto the second shaft 86). For example, in some instances, the flange 82 and the nut 88 can be engaged with the same threaded surface 170 of the second shaft 86. The nut 88 can be threaded onto the second shaft 86 until the nut 88 contacts the outer surface 62 of the casing 29, a threshold torque is reached, or both. Torque may be applied via one or more flat portions 192 of the nut 88. Connecting the nut 88 with the second shaft 86 can include compressing or deforming the second seal 146, at least to some degree, such as to provide a fluid seal between the flange 82 and the inner surface 60 of the casing 29. Additionally or alternatively, connecting the nut 88 with the second shaft 86 can clamp a portion of the casing 29 between the flange 82 and the nut 88, which may rigidly fix the nozzle 38 with the casing 29. While the nut 88 is being connected to the second shaft 86, one or both of the first shaft 84 or the second shaft 86 may be held in place, such as via applying a force or torque to the flat portions 158, 176, such as to prevent rotational forces applied to the nut 88 from being transferred to the flange 82 or the nozzle tube 70, which can help prevent damage to or misalignment of the nozzle tube 70, the dome wall 46 (FIG. 4), or both. Connection of the nut 88 with the second shaft 86 can complete connection of the coupling 80 (and the fuel nozzle assembly 48) with the casing 29.

With some aspects, an assembled coupling 80 can provide a leak path LP. The leak path LP can provide fluid communication from inside the coupling 80 to the space 200 outside of the casing 29. For example, if a leak occurs in the coupling 80, it may be desirable to provide leaking fluid to the space 200 outside of the casing 29 instead of to the space 202 inside of the casing 29. The outer surface 62 of the casing 29 may at least partially define the space 200. The inner surface 60 of the casing 29 may at least partially define the space 202. A leak may occur, in some instances, between the flange 82 and the first shaft 84. Such a leak could include a portion of the fluid (e.g., fuel) flowing through the first fluid passage 100 flowing radially outward between the axial surfaces 120, 126 and past the first seal 144 instead of flowing into the second fluid passage 102. The leaking fluid may then reach the inner surface 210 of the second shaft 86. The one or more leak channels 154 of the first shaft 84, the one or more leak channels 182 of the second shaft 86, or a combination thereof, can reduce the resistance to fluid flow between the first and second shafts 84, 86, such as to promote flow of the leaking fluid toward the space 200 outside the casing 29.

With some examples, the first and second shafts 84, 86 can be disposed such that a radial gap 212 is disposed between an outer surface 214 (e.g., an outer radial surface) of the first shaft 84 and the inner surface 210 of the second shaft 86. Leaking fluid can flow through the one or more leak channels 154, 182 into the radial gap 212 and then into the space 200. For example, the leak path LP can include space between the axial surfaces 120, 126, space between the outer surface 214 of the first shaft 84 and the inner surface 210 of the second shaft 86 at the first axial ends 150, 172, space between the second axial surface 156 of the first shaft 84 and the inner axial surface 180 of the second shaft 86, one or more leak channels 154 of the first shaft 84, one or more leak channels 182 of the second shaft 86, the radial gap 212, or a combination thereof. The resistance to fluid flow of the leak path LP can be lower than the resistance to fluid flow between the threaded surfaces 116, 170 of the flange 82 and the second shaft 86, so most or all of the leaking fluid may flow through the leak path LP to the space 200 outside of the casing 29 instead of to the space 202 inside the casing. While the leak channels 154, 182 are shown in axial surfaces of the shafts 84, 86, radial surfaces 214, 210 of the shafts 84, 86 can, additionally or alternatively, include the leak channels 154, 182.

With some examples, the first shaft 84 and the second shaft 86 can be cylindrical, hollow, disposed in a concentric configuration, or a combination thereof. In some examples of an assembled nozzle 38, portions of the first shaft 84, the second shaft 86, and the nut 88 can overlap in the radial direction (e.g., relative to a centerline 80a of the coupling 80). Additionally or alternatively, in some examples of an assembled nozzle 38, portions of the first shaft 84, the second shaft 86, and the casing 29 can overlap in the radial direction. Additionally or alternatively, in some examples of an assembled nozzle 38, portions of the flange 82, the first seal 144, the second shaft 86, and the second seal 146 can overlap in the radial direction. The diameter of the casing hole 76 can, in some configurations, be larger than the outer diameter of the second shaft 86 such that, in an assembled configuration, the second shaft 86 is not in contact with the casing 29, such that the second shaft 86 can rotate in the casing hole 76 (e.g., when connecting to the flange 82) without contacting the casing 29, or both.

In some examples, the nozzle tube 70 can be fixed (e.g., brazed, welded, among others) to the flange 82 prior to connecting the nozzle tube 70 with the dome wall 46, prior to connecting the first shaft 84 with the flange 82, or prior to both. Additionally or alternatively, the nozzle tube 70 can be fixed (e.g., rigidly) to the dome wall 46 prior to connecting the first shaft 84 with the flange 82. The flange 82, in some instances, may not extend into the casing hole 76, such as to facilitate connection of the nozzle tube 70 with the dome wall 46, which can be generally perpendicular to the centerline 80a of the coupling 80.

Figure 10:
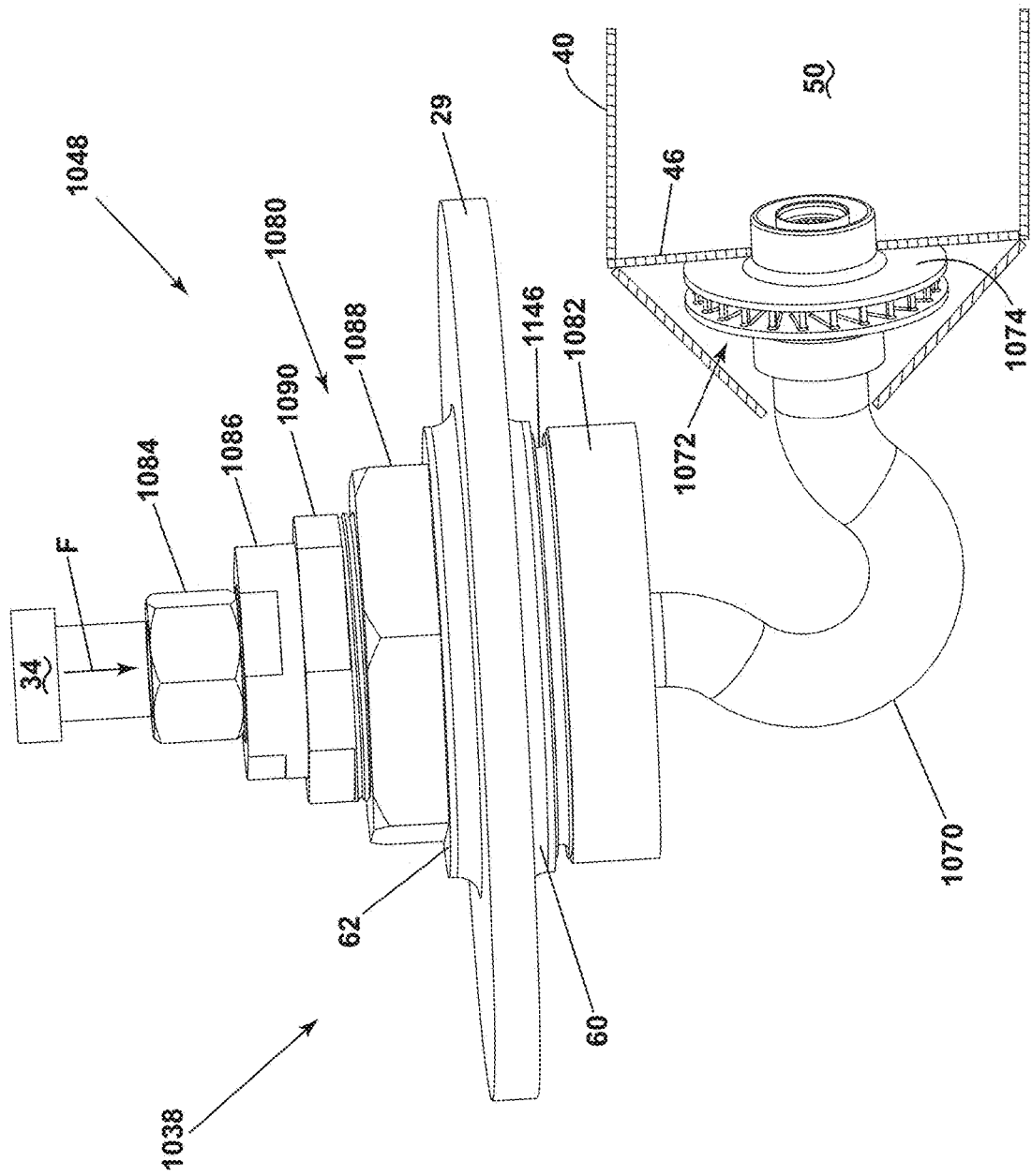
FIG. 10 is a schematic perspective view illustrating portions of a fuel nozzle connected to a casing and a dome wall in accordance with various aspects described herein.

FIG. 10 depicts a fuel nozzle assembly 1048 including a fuel nozzle 1038 and a coupling 1080 connected to the combustion chamber 50. The fuel nozzle 1038 can include aspects similar to those of the fuel nozzle 38; therefore, like parts will be described with like numerals further increased by 1000, with it being understood that the description of the like parts of the fuel nozzle 38 can apply to the fuel nozzle 1038, except where noted.

The fuel nozzle 1038 can include a nozzle tube 1070. The nozzle tube 1070 can be fluidly coupled to the fuel supply 34. The nozzle tube 1070 can provide fuel F received by the fuel nozzle 1038 (e.g., from the fuel supply 34) to the combustion chamber 50. The nozzle tube 1070 can include a nozzle tip 1072 disposed at its distal end. The nozzle tip 1072 can include one or more openings that allow fuel F to exit the fuel nozzle 1038 and enter the combustion chamber 50. The fuel nozzle 1038 can include or be connected to a swirler 1074 that can be connected (e.g., rigidly fixed) to the dome wall 46.

According to an aspect of the present disclosure, a proximal end of the nozzle tube 1070 can be connected to the coupling 1080, which can be connected to the casing 29, the fuel supply 34, or both.

Figure 11:
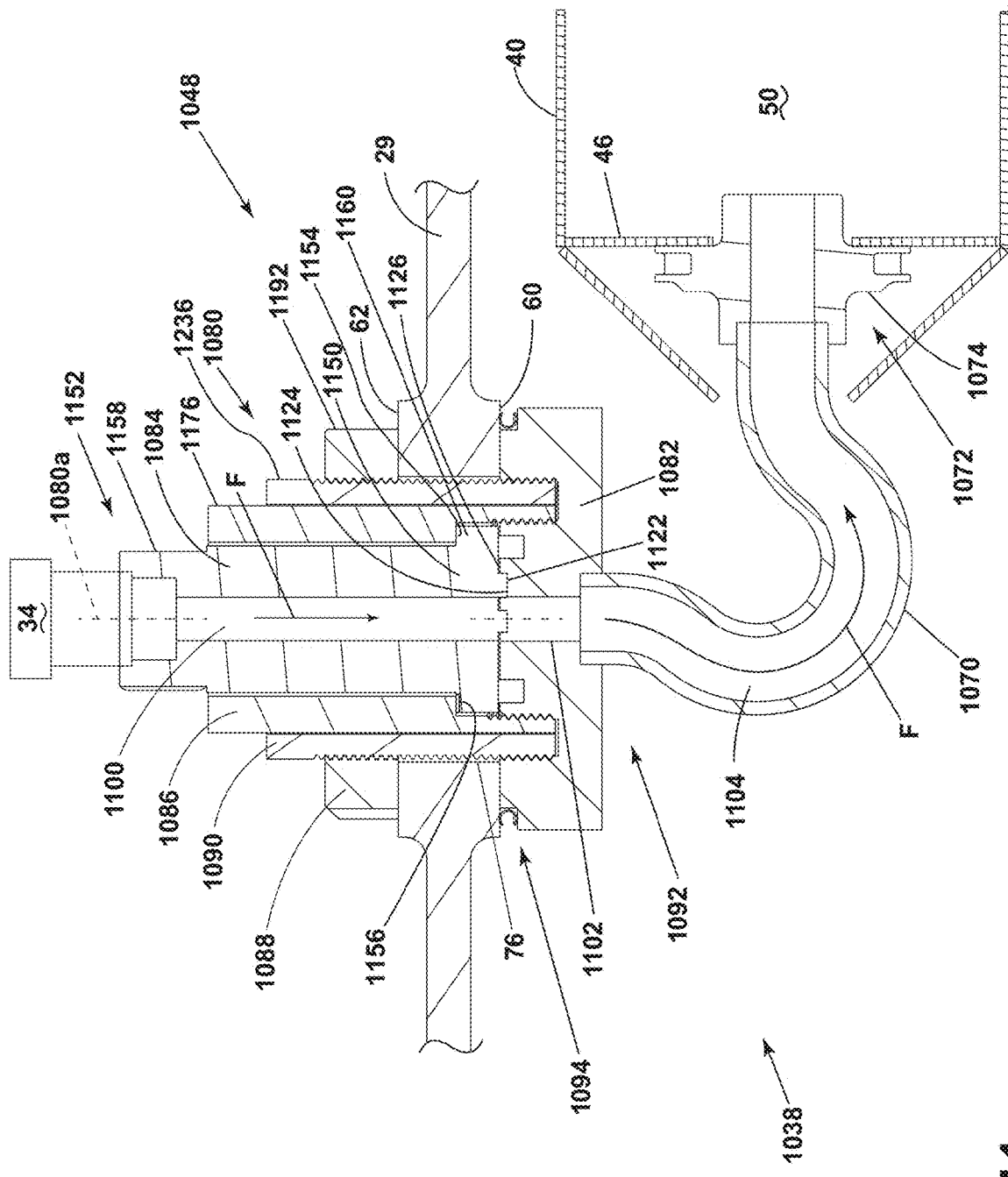
FIG. 11 is a schematic sectional view of the fuel nozzle of FIG. 10.

FIG. 11 depicts a cross-section of the fuel nozzle 1038 connected to the casing 29 via the coupling 1080. With some aspects, the coupling 1080 can include a flange 1082, a first shaft 1084, a second shaft 1086, a nut 1088, and a third shaft 1090. The flange 1082 can be connected (e.g., rigidly fixed) to a proximal end of the nozzle tube 1070. In an assembled configuration, the flange 1082 can be adjacent to or in contact with the inner surface 60 of the casing 29. The first shaft 1084 can be engaged with the flange 1082 and can, in some configurations, include one or more portions (e.g., formations 1122) that extend through the casing hole 76 beyond the outer surface 62 of the casing 29. The second shaft 1086 can be disposed at least partially around the flange 1082, the first shaft 1084, or both, extend through the casing hole 76, engage the flange 1082, or a combination thereof. The third shaft 1090 can be disposed at least partially around the flange 1082, the first shaft 1084, the second shaft 1086, or a combination thereof. The third shaft 1090 can extend through the casing hole 76, engage the flange 1082, or a combination thereof. The nozzle tube 1070 can be disposed at a first side 1092 (e.g., an inner side) of the flange 1082, and the nut 1088 can be disposed at a second side 1094 (e.g., an outer side) of the flange 1082 that is opposite the first side 1092. The nut 1088 can engage the third shaft 1090 and contact the outer surface 62 of the casing 29, such as to apply a clamping force to the casing 29 between the nut 1088 and the flange 1082 to fix (e.g., rigidly) the fuel nozzle 1038 with the casing 29. For example, the nut 1088 may be disposed opposite the flange 1082 with a portion of the casing 29 therebetween.

With some aspects, the first shaft 1084 includes a first fluid passage 1100, the flange 1082 includes a second fluid passage 1102, and the nozzle tube 1070 includes a third fluid passage 1104. In an assembled configuration, the first fluid passage 1100 can be fluidly coupled with the fuel supply 34 and fluidly coupled with the second fluid passage 1102. The second fluid passage 1102 can be fluidly coupled with the third fluid passage 1104, such as to provide fluid communication from the fuel supply 34 to the combustion chamber 50.

With some aspects, the first shaft 1084 can be configured in the same or similar manner as the first shaft 84 (see, e.g., FIGS. 6 and 7). For example, the first shaft 1084 can include a first axial end 1150 including a first axial surface 1126 having formations 1124, a second axial surface 1156, one or more leak channels 1154 formed in the second axial surface 1156, a second axial end 1152 including one or more flat portions 1158. The first axial end 1150 can include a radial extension 1160 having a larger diameter than other portions of the first axial end 1150, the second axial end 1152, or both. The radial extension 1160 can define the second axial surface 1156, and may provide the outer radial surface of the first shaft 1084 with a stepped configuration.

Figure 12:
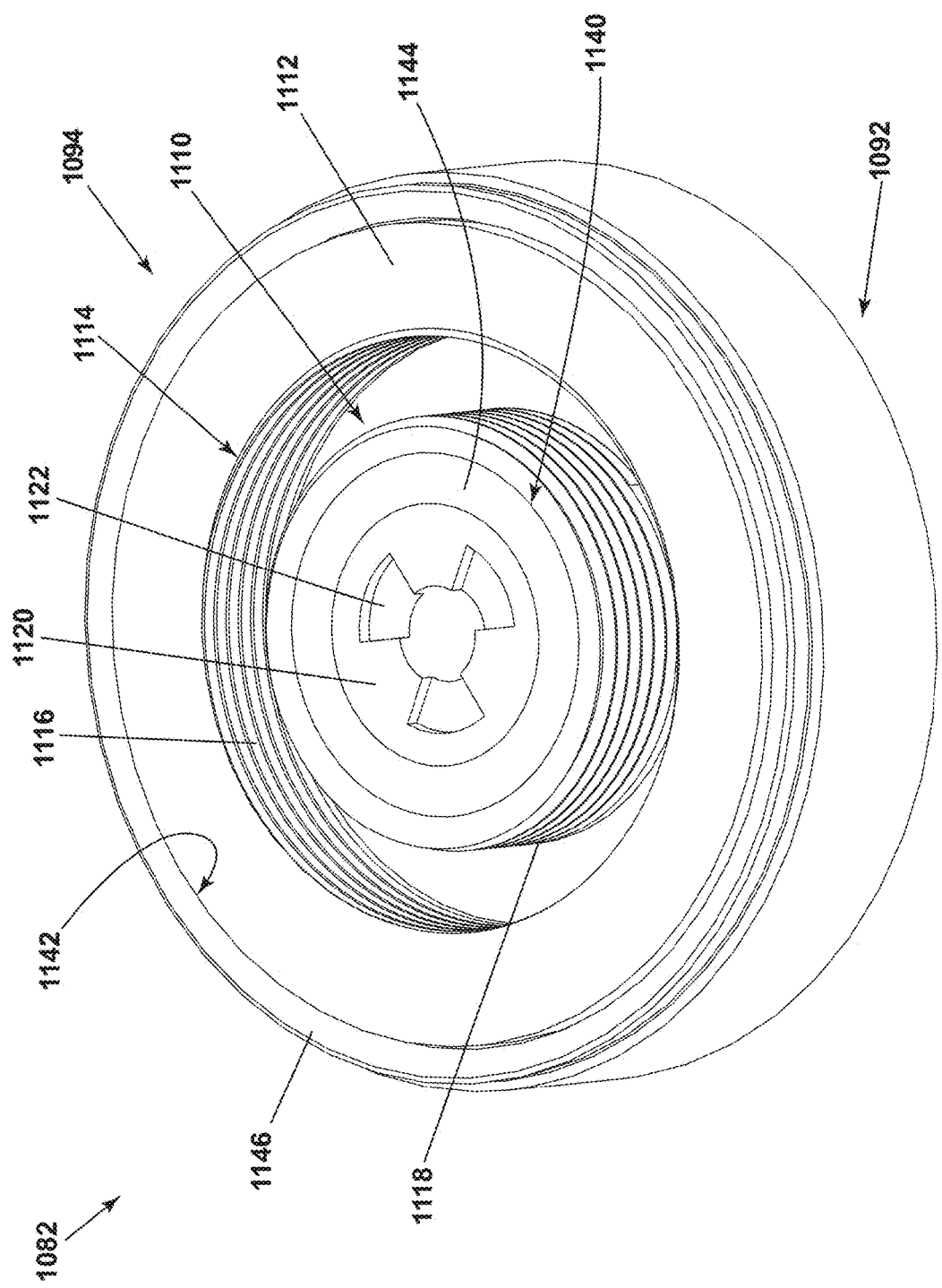
FIG. 12 is a perspective view of a flange of a coupling of a fuel nozzle in accordance with various aspects described herein.

FIG. 12 depicts an example of the flange 1082. The flange 1082 can include a similar configuration as the flange 82 (FIG. 5) and may additionally include a second threaded surface 1118. For example, the flange 1082 can include an inner portion 1110, an outer portion 1112, a channel 1114, a first threaded surface 1116 provided in the channel 1114, an axial surface 1120 that may face away from nozzle tube 1070 (FIG. 11), one or more axially-extending formations 1122, a first seal recess 1140, a second seal recess 1142, a first seal 1144 that can be disposed at least partially in the first seal recess 1140, a second seal 1146 that can be disposed at least partially in the second seal recess 1142, or a combination thereof. The second threaded surface 1118 may face radially outward toward the first threaded surface 1116. For example, the threaded surface 1116, 1118 can be disposed at opposite radial sides of the channel 1114.

Figure 13:
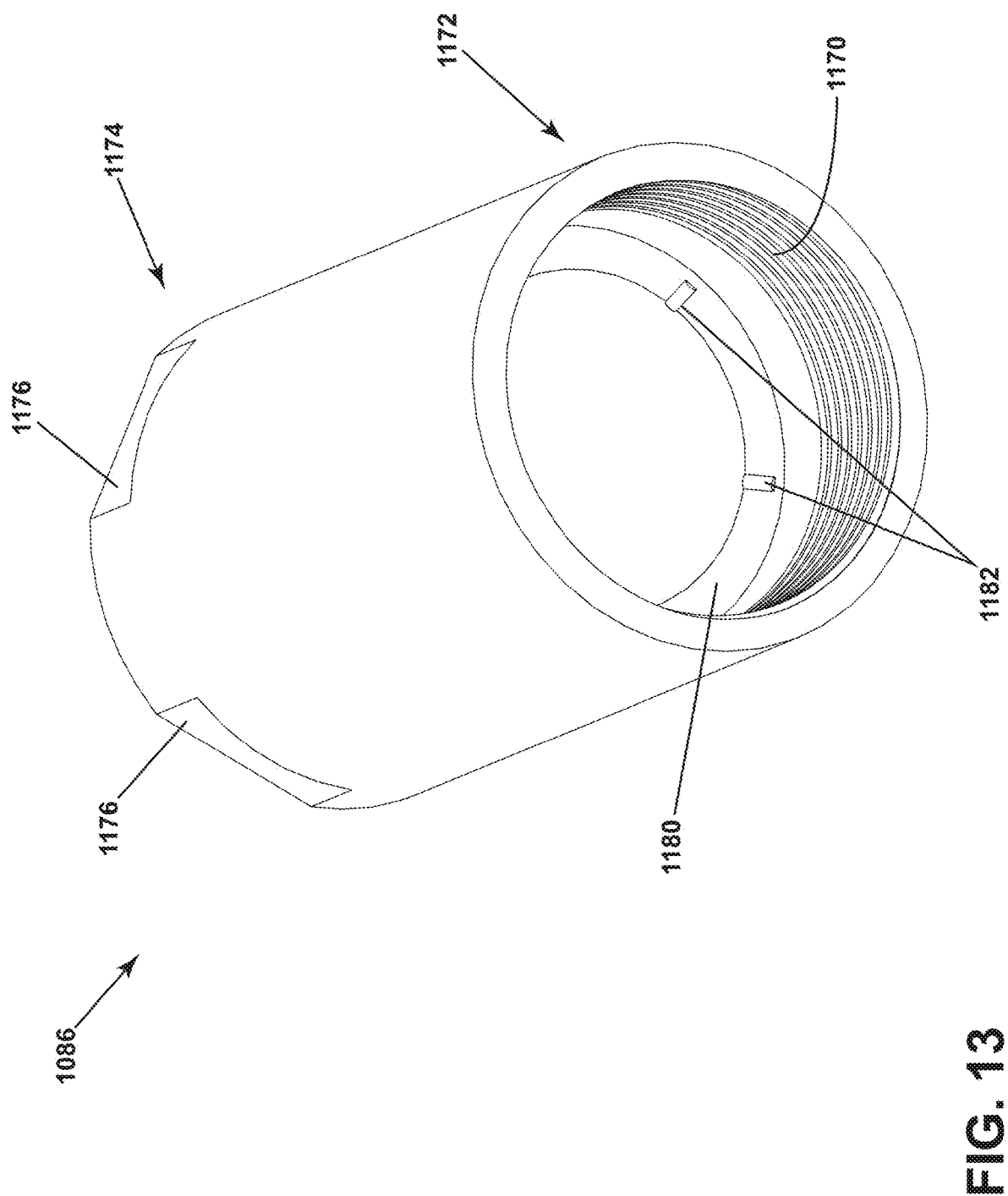
FIG. 13 is a perspective view of a second shaft of a coupling of a fuel nozzle in accordance with various aspects described herein.

FIG. 13 depicts an example of the second shaft 1086. The second shaft 1086 can include a threaded surface 1170, which can be disposed at an inner radial surface of the second shaft 1086. The threaded surface 1170 can engage the first threaded surface 1116 of the flange 1082 (see, e.g., FIG. 15). A first axial end 1172 of the second shaft 1086 can be inserted at least partially into the channel 1114, such as when the threaded surface 1170 of the second shaft 1086 engages the first threaded surface 1116 of the flange 1082. A second axial end 1174 of the second shaft 1086 can include one or more flat portions 1176, such as for applying torque or resisting the application of torque to the second shaft 1086. The second shaft 1086 can include an inner axial surface 1180 that can include one or more leak channels 1182. The inner axial surface 1180 can face toward the flange 1082. The one or more leak channels 1182 can at least partially form a leak path LP for fluid that flows out of the first fluid passage 1100 (FIG. 11) or the second fluid passage 1102 (FIG. 11) and past the first seal 1144 (FIG. 12) between the axial surface 1120 (FIG. 12) of the flange 1082 (FIG. 12) and the first axial surface 1126 (FIG. 12) of the first shaft 1084 (see, e.g., FIG. 15). In some configurations, the leak channels 1182 of the second shaft 1086 can cooperate with the leak channels 1154 (FIG. 11) of the first shaft 1084. In other configurations, the leak channels 1182 can function separately from and in additional to the leak channels 1154 (FIG. 11), or instead of the leak channels 1154. In an assembled configuration (FIG. 11), the inner axial surface 1180 of the second shaft 1086 can be adjacent to, in contact with, or both, the second axial surface 1156 of the first shaft 1084. The first axial end 1172 of the second shaft 1086 can include a larger inner diameter than the second axial end 1174, which may provide an inner surface 1210 of the second shaft 1086 with a stepped configuration that can correspond to the stepped configuration of the first shaft 1084. The inner axial surface 1180 may extend radially between the larger inner diameter of the first axial end 1172 and the smaller inner diameter of the second axial end 1174.

Figure 14:
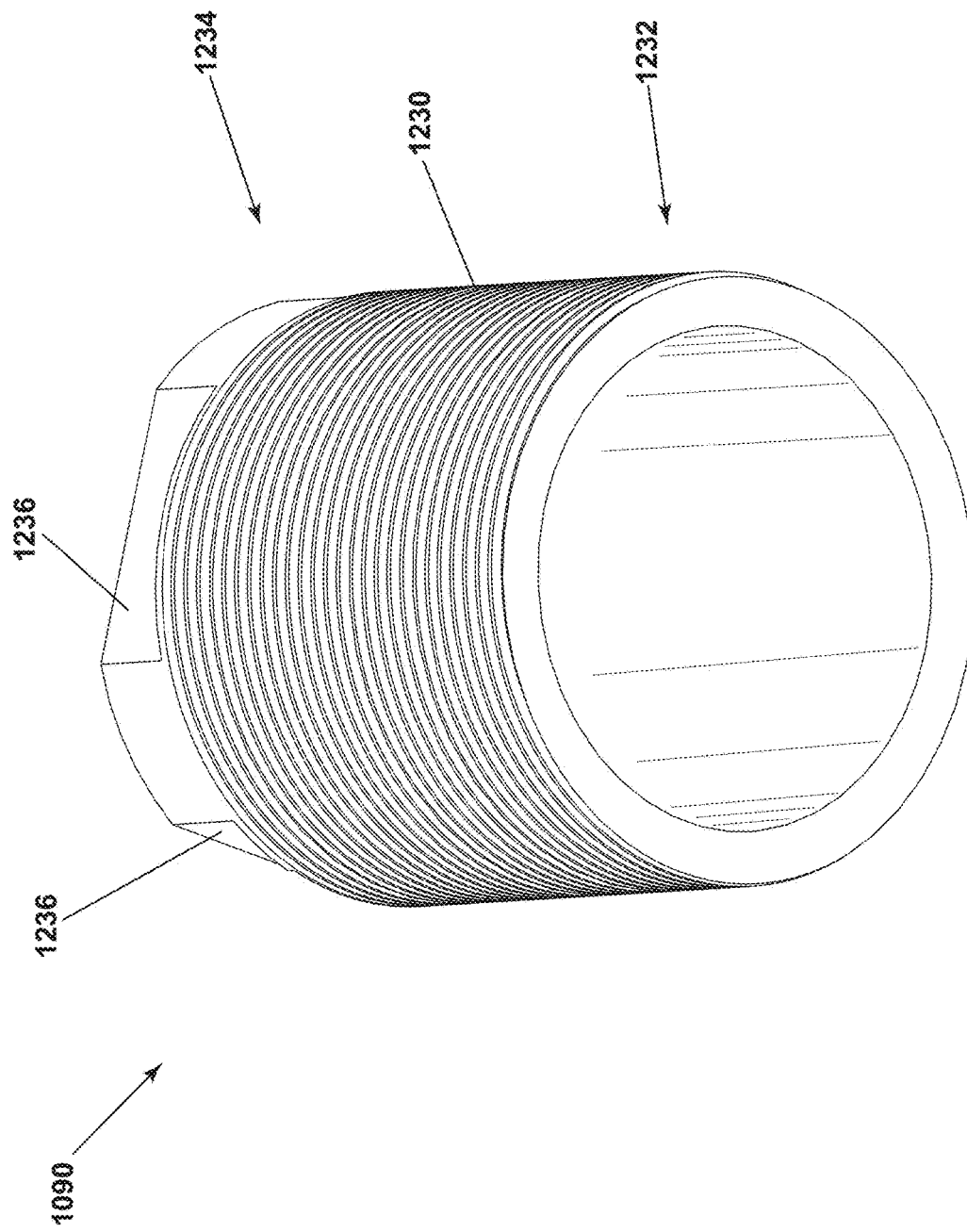
FIG. 14 is a perspective view of a third shaft of a coupling of a fuel nozzle in accordance with various aspects described herein.

FIG. 14 depicts an example of the third shaft 1090. The third shaft 1090 can include a threaded surface 1230 that can be disposed at an outer radial surface of the third shaft 1090. The threaded surface 1230 can extend from a first axial end 1232 of the third shaft 1090 toward a second axial end 1234 of the third shaft 1090. The second axial end 1234 can include one or more flat portions 1236, such as for applying torque or resisting the application of torque to the third shaft 1090. The third shaft 1090 can, for example, be cylindrical, hollow, or both.

Figure 15:
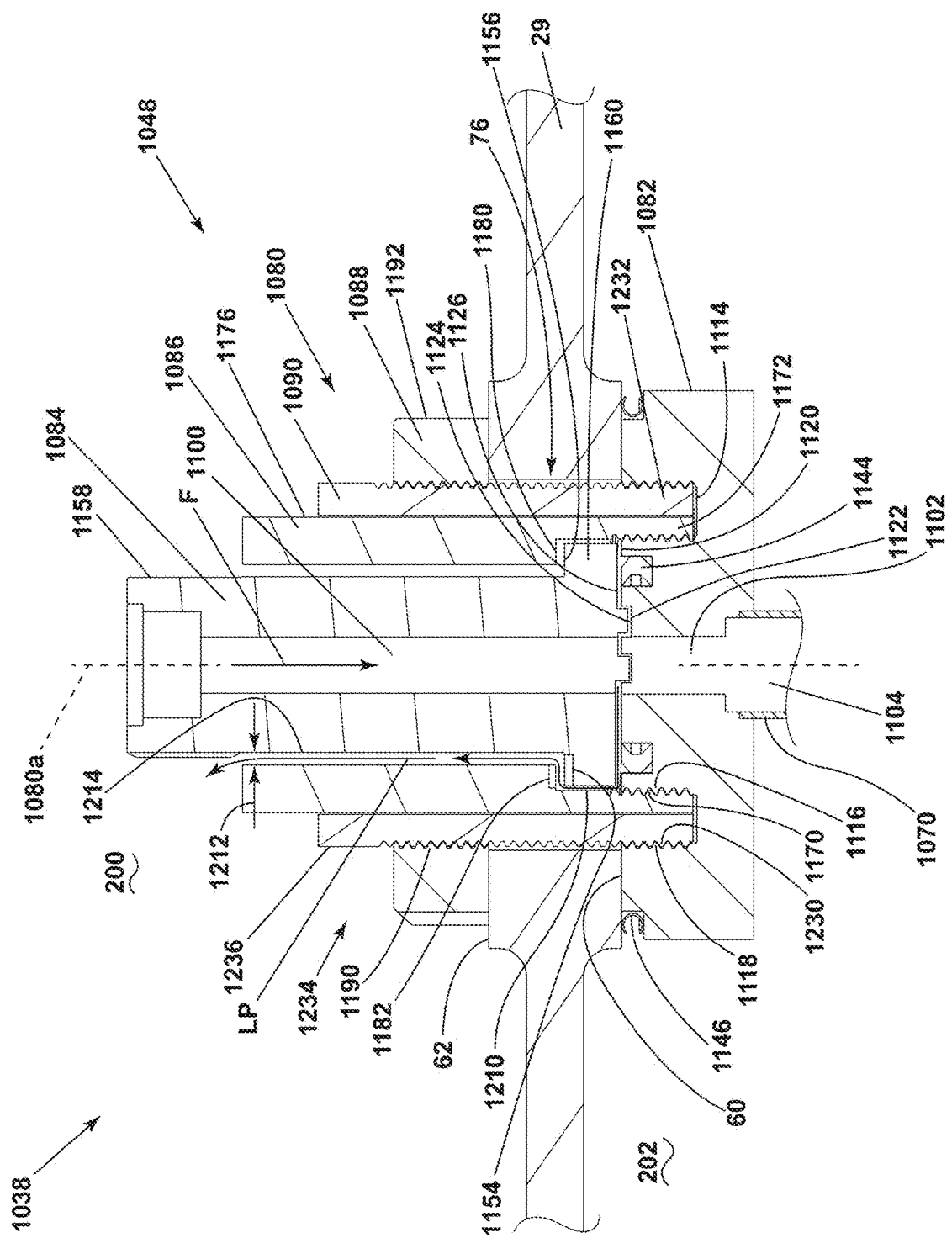
FIG. 15 is an enlarged sectional view of a coupling of a fuel nozzle connected to a casing in accordance with various aspects described herein.

FIG. 15 depicts an example of the coupling 1080 of the fuel nozzle 1038 in an assembled configuration with the casing 29. Assembling the fuel nozzle 1038 and the coupling 1080 with the casing 29 can include moving the flange 1082 proximate the casing hole 76, which can include disposing the flange 1082 adjacent or in contact with the inner surface 60 of the casing 29. Additionally or alternatively, moving the flange 1082 proximate the casing hole 76 can include moving the second seal 1146 adjacent or in contact with the inner surface 60. In some configurations, the flange 1082 can be held adjacent or in contact with the inner surface 60 via a connection of the nozzle tube 1070 with the dome wall 46 (FIGS. 10 and 11). For example, the nozzle tube 1070 can be fixed to the dome wall 46 (FIGS. 10 and 11) prior to completing assembly of the coupling 1080 with the casing 29, which can facilitate assembly of the coupling 1080 with the casing 29.

With some aspects, the first shaft 1084 can be connected to the flange 1082, which can include inserting the first shaft 1084 at least partially into the casing hole 76, engaging one or more formations 1122 of the flange 1082 with one or more formations 1124 of the first shaft 1084, disposing the first axial surface 1126 of the first shaft 1084 in contact with the axial surface 1120 of the flange 1082, aligning the first fluid passage 1100 with the second fluid passage 1102, disposing the first axial surface 1126 in contact with the first seal 1144, or a combination thereof.

In some examples, after the first shaft 1084 is connected to the flange 1082, the second shaft 1086 can be connected to the flange 1082. Connecting the second shaft 1086 to the flange 1082 can include engaging the threaded surface 1170 of the second shaft 1086 with the threaded surface 1116 of the flange 1082, which can include inserting the first axial end 1172 of the second shaft 1086 at least partially into the channel 1114 of the flange 1082 (e.g., screwing the second shaft 86 into the flange 1082). Additionally or alternatively, connecting the second shaft 1086 to the flange 1082 can clamp at least a portion of the first shaft 1084 between the axial surface 1120 of the flange 1082 and the inner axial surface 1180 of the second shaft 1086. Clamping the first shaft 1084 between the flange 1082 and the second shaft 1086 can, at least to some degree, compress or deform the first seal 1144, such as to provide a fluid seal between the flange 1082 and the first shaft 1084. With some configurations, the first shaft 1084 can be held in place, such as via applying a force or torque to the flat portions 1158, while the second shaft 1086 is connected to the flange 1082, which can also hold the flange 1082 in place, such as via engagement between the formations 1122, 1124. For example, holding the first shaft 1084 in place can prevent rotational forces or torque applied to the second shaft 1086 (e.g., via flat portions 1176) from being transferred to the flange 1082 or the nozzle tube 1070, such as to prevent damage to or misalignment of the nozzle tube 1070, the dome wall 46 (FIG. 11), or both.

With some examples, after the second shaft 1086 is connected with the flange 1082, the third shaft 1090 can be connected with the flange 1082. Connecting the third shaft 1090 with the flange 1082 can include engaging the threaded surface 1230 of the third shaft 1090 with the threaded surface 1118 of the flange 1082, which can include inserting the first axial end 1232 of the third shaft 1090 at least partially into the channel 1114 of the flange 1082 (e.g., screwing the third shaft 1090 into the flange 1082). With some configurations, the first shaft 1084 and the second shaft 1086 can be held in place, such as via applying a force or torque to the flat portions 1158, 1176, while the third shaft 1090 is connected to the flange 1082, which can also hold the flange 1082 in place, such as via engagement between the formations 1122, 1124. For example, holding the first shaft 1084 in place can prevent rotational forces or torque applied to the third shaft 1090 (e.g., via flat portions 1236) from being transferred to the flange 1082 or the nozzle tube 1070, such as to prevent damage to or misalignment of the nozzle tube 1070, the dome wall 46 (FIG. 11), or both.

With some examples, after the third shaft 1090 is connected with the flange 1082, the nut 1088 can be connected to the third shaft 1090. Connecting the nut 1088 to the third shaft 1090 can include engaging a threaded inner surface 1190 of the nut 1088 with the threaded surface 1230 of the third shaft 1090 (e.g., the nut 1088 may be screwed onto the third shaft 1090). The nut 1088 can be threaded onto the third shaft 1090 until the nut 1088 contacts the outer surface 62 of the casing 29, a threshold torque is reached, or both. Torque may be applied to the nut 1088 via one or more flat portions 1192 of the nut 1088. Connecting the nut 1088 with the third shaft 1090 can include compressing or deforming the second seal 1146, at least to some degree, such as to provide a fluid seal between the flange 1082 and the inner surface 60 of the casing 29. Additionally or alternatively, connecting the nut 1088 with the third shaft 1090 can clamp a portion of the casing 29 between the flange 1082 and the nut 1088, which may rigidly fix the nozzle 38 with the casing 29. While the nut 1088 is being connected to the third shaft 1090, one or a combination of the first shaft 1084, the second shaft 1086, or the third shaft 1090 may be held in place, such as via applying a force or torque to the flat portions 1158, 1176, 1236, which may prevent rotational forces applied to the nut 1088 from being transferred to the flange 1082 or the nozzle tube 1070, which can help prevent damage to and misalignment of the nozzle tube 1070, the dome wall 46 (FIG. 11), or both. Connection of the nut 1088 with the third shaft 1090 can complete connection of the coupling 1080 (and the fuel nozzle assembly 1048) with the casing 29.

With some aspects, an assembled coupling 1080 can provide a leak path LP. The leak path LP can provide fluid communication from inside the coupling 1080 to the space 200 outside of the casing 29. For example, if a leak occurs in the coupling 1080, it may be desirable to provide leaking fluid to the space 200 outside of the casing 29 instead of to the space 202 inside of the casing 29. A leak may occur, in some instances, between the flange 1082 and the first shaft 1084. Such a leak could include a portion of the fluid F (e.g., fuel) flowing through the first fluid passage 1100 flowing radially outward between the axial surfaces 1120, 1126 and past the first seal 1144 instead of flowing into the second fluid passage 1102. The leaking fluid may then reach the inner surface 1210 of the second shaft 1086. The one or more leak channels 1154 of the first shaft 1084, the one or more leak channels 1182 of the second shaft 1086, or a combination thereof, can reduce the resistance to fluid flow between the first and second shafts 1084, 1086, such as to promote flow of the leaking fluid toward the space 200 outside the casing 29, as opposed to toward the space 202.

With some examples, the first and second shafts 1084, 1086 can disposed such that a radial gap 1212 is disposed between an outer surface 1214 of the first shaft 1084 and the inner surface 1210 of the second shaft 1086. Leaking fluid can flow through the one or more leak channels 1154, 1182 into the radial gap 1212 and then into the space 200. For example, the leak path LP can include space between the axial surfaces 1120, 1126, space between the outer surface 1214 of the first shaft 1084 and the inner surface 1210 of the second shaft 1086 at the first axial ends 1150, 1172, space between the second axial surface 1156 of the first shaft 1084 and the inner axial surface 1180 of the second shaft 1086, one or more leak channels 1154 of the first shaft 1084, one or more leak channels 1182 of the second shaft 1086, the radial gap 1212, or a combination thereof. The resistance to fluid flow of the leak path LP can be lower than the resistance to fluid flow between the threaded surfaces 1116, 1170 of the flange 1082 and the second shaft 1086 and the third shaft 1090, so most or all of the leaking fluid may flow through the leak path LP to the space 200 outside of the casing 29 instead of the space 202 inside the casing.

With some examples, the first shaft 1084 and the second shaft 1086 can be hollow, cylindrical, disposed in a concentric configuration, or a combination thereof. In some examples of an assembled fuel nozzle 1038, portions of the first shaft 1084, the second shaft 1086, the nut 1088, and the third shaft 1090 can overlap in the radial direction (e.g., relative to a centerline 1080a of the coupling 1080). Additionally or alternatively, in some examples of an assembled fuel nozzle 1038, portions of the first shaft 1084, the second shaft 1086, the third shaft 1090, and the casing 29 can overlap in the radial direction. Additionally or alternatively, in some examples of the assembled fuel nozzle 1038, portions of the flange 1082, the first seal 1144, the second shaft 1086, the third shaft 1090, and the second seal 1146 can overlap in the radial direction. The diameter of the casing hole 76 can, in some configurations, be larger than the outer diameter of the third shaft 1090 such that, in an assembled configuration, the third shaft 1090 is not in contact with the casing 29, such that the third shaft 1090 can rotate in the casing hole 76 (e.g., when connecting to the flange 1082) without contacting the casing 29, or both.

In some examples, the nozzle tube 1070 can be fixed (e.g., brazed, welded, among others) to the flange 1082 prior to connecting the nozzle tube 1070 with the dome wall 46 (FIG. 2), prior to connecting the first shaft 1084 with the flange 1082, or prior to both.

Figure 16:
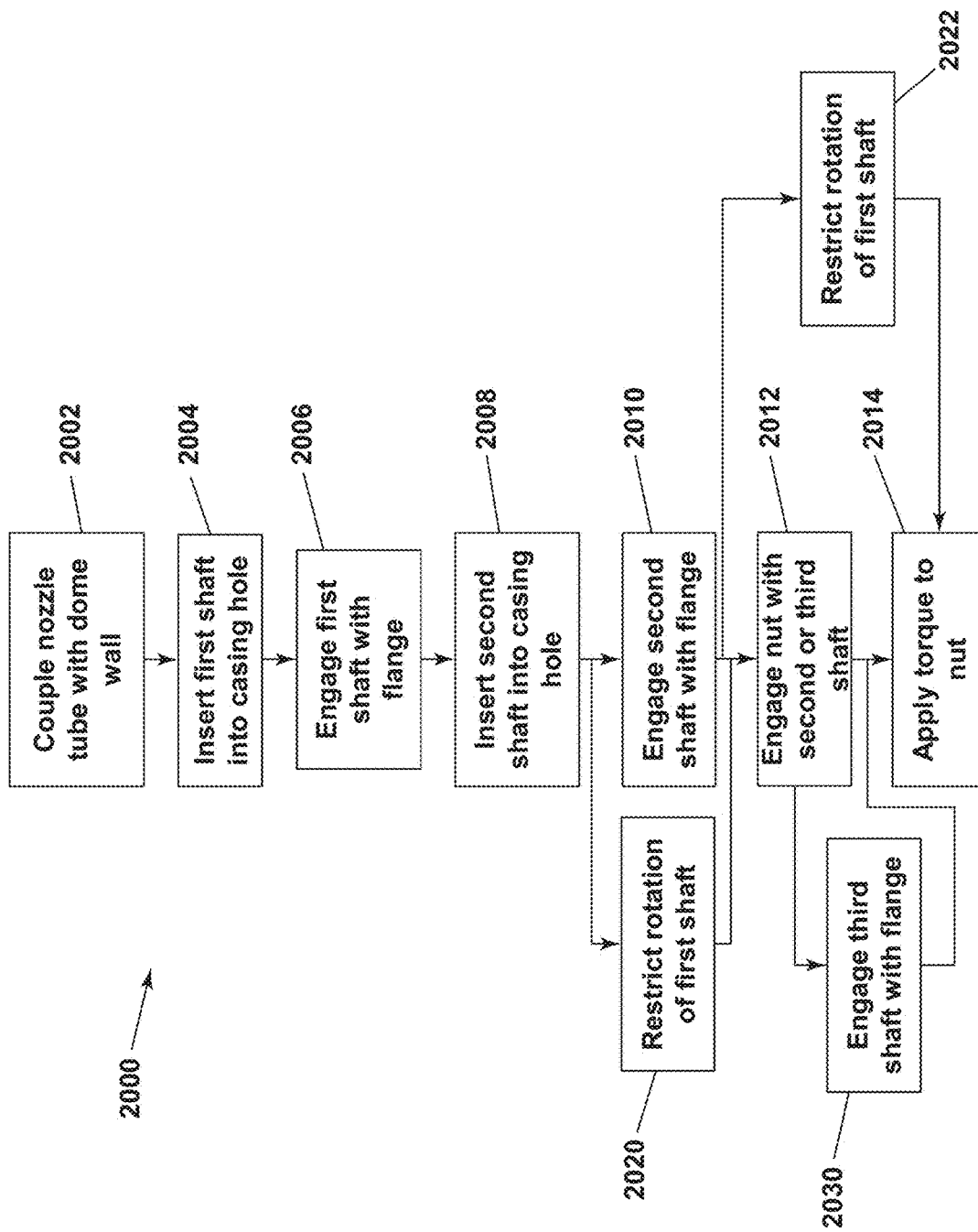
FIG. 16 is a flow diagram illustrating a method of assembling a fuel nozzle assembly in a gas turbine engine in accordance with various aspects described herein.

Referring to FIG. 16, a method 2000 of assembling a fuel nozzle assembly 48, 1048 according to the embodiments of FIGS. 2-15, which can include a fuel nozzle 38, 1038 and a coupling 80, 1080, in a gas turbine engine 10, which can include a dome wall 46 and a casing 29, is generally illustrated. The method 2000 can include coupling a nozzle tube 70, 1070 to the dome wall 46 (block 2002), inserting a first shaft 84, 1084 into a hole 76 of the casing 29 (block 2004), engaging the first shaft 84, 1084 with a flange 82, 1082 (block 2006), inserting a second shaft 86, 1086 into the hole 76 of the casing 29 (block 2008), engaging the second shaft 86, 1086 with the flange 82, 1082 (block 2010), engaging a nut 88, 1088 with the second shaft 86, 1086 or a third shaft 1090 (block 2012), applying torque to the nut 88, 1088 to secure the fuel nozzle assembly 48, 1048 with the casing 29 (block 2014), or a combination thereof. The method 2000 can include restricting rotation of the first shaft 84, 1084 while engaging the second shaft 86, 1086 with the flange 82, 1082 (block 2020), and restricting rotation of the second shaft 86, 1086 while engaging the nut 88, 1088, applying torque to the nut 88, 1088, or both (block 2022). Restricting rotation of the first shaft 84, 1084 can include applying a force or torque to a portion of the first shaft 84, 1084 disposed outside of the casing 29. Engaging the second shaft 86, 1086 with the flange 82, 1082 can include applying a second force or torque to a portion of the second shaft 86, 1086 disposed outside of the casing 29. Restricting rotation of the second shaft 86, 1086 can include applying a third force or torque to the portion of the second shaft 86, 1086 disposed outside of the casing 29. The nut 88, 1088 can be disposed outside of the casing 29.

Engaging the first shaft 84, 1084 with the flange 82, 1082 can include inserting, in an axial direction, a tooth 122, 1122, 124, 1124 of one of the first shaft 84, 1084 or the flange 82, 1082 into a recess 122, 1122, 124, 1124 of the other of the first shaft 84, 1084 and the flange 82, 1082. Connecting the nozzle tube 70, 1070 to the dome wall 46 can include rigidly fixing the nozzle tube 70, 1070 to the dome wall 46 prior to engaging the nut 88, 1088 with the second shaft 86, 1086 or the third shaft 1090. Connecting the nozzle tube 70 to the dome wall 46 can include rigidly fixing the nozzle tube 70, 1070 to the dome wall 46 prior to inserting the first shaft 84, 1084 into the hole 76. The method 2000 can include engaging (e.g., threadedly engaging) the third shaft 1090 with the flange 1082 (block 2030). The nut 1088 can be engaged with the third shaft 1090. Threadedly engaging the third shaft 1090 with the flange 1082 can include deforming a seal 1146 disposed between the flange 1082 and an inner surface 60 of the casing 29.

Connecting a fuel nozzle 38, 1038 with a casing via a threaded shaft and a nut, as opposed to a plurality of separate bolts inserted into separate holes, can reduce or eliminate stress concentrators from the connection between the fuel nozzle 38, 1038 and the casing 29, and provide more uniform clamping force between the fuel nozzle 38, 1038 and the casing 29. In some instances, such a configuration can provide more uniform forces to the first seal 144, 1144, which can provide improved fluid sealing. Additionally or alternatively, such a configuration can reduce a minimum strength of one or more portions of the casing 29, such as compared to other designs that may have increased strength to withstand concentrated forces (e.g., from a plurality of separate bolts).

In some examples, in an assembled configuration, flat portions 158, 176, 192, 1158, 1176, 1192, 1236 can be disposed outside of the casing 29, such as in the space 200. The nut 88, 1088 can be disposed entirely outside of the casing 29. The first shaft 84, 1084 can extend axially beyond the second shaft 86, 1086 (e.g., in a direction away from the casing 29) such that flat portions 158, 1158 are not covered by the second shaft 86, 1086. In examples with a third shaft 1090, the second shaft 1086 may extend axially beyond the third shaft 1090 such that flat portions 1176 are not covered by the third shaft 1090. For example, the first shaft 84, 1084 may be longer than the second shaft 86, 1086, which may be longer than the third shaft 1090. The first shaft 84, 1084, the second shaft 86, 1086, and the third shaft 1090 can extend axially beyond the nut 88, 1088 such that the flat portions 158, 176, 1158, 1176, 1236 are not covered by the nut.

The flange 82, 1082 can be disposed entirely inside of the casing 29. The shafts 84, 86, 1084, 1086, 1090 can be disposed partially outside of the casing 29, partially in the hole 76 of the casing 29, partially inside the casing 29, or a combination thereof.

With some aspects, providing a fuel nozzle 38, 1038 with a deliberate leak path can reduce or eliminate fluid that leaks from the fuel nozzle 38, 1038 from flowing into the space 202 inside the casing 29 and instead cause the leaking fluid to flow into the space 200 outside of the casing 29. The space 200 outside of the casing 29 may be better configured to detect, mitigate, compensate for, or a combination thereof, leaking fluid, compared to the space 202 inside the casing 29. For example and without limitation, the space 200 can include one or more leak detectors.

While the first shaft 84, 1084 is shown as a separate component, the first shaft 84, 1084 could be incorporated into another component or system, such as an adapter or the fuel supply 34 (e.g., a fuel manifold). Additionally or alternatively, the first shaft 84, 1084 can include one or more additional components, such as a check valve, a valve housing, or both, among others.

In some configurations, one or more portions of the fuel nozzle 38, 1038, the dome wall 46, and the swirler 74, 1074 can be pre-assembled as a subassembly. For example, the swirler 74, 1074 can be fixed to (e.g., brazed with) the dome wall 46 and the nozzle tube 70, 1070 or a nozzle tip 72, 1072 thereof can be fixed (e.g., bolted, brazed, welded, riveted, fastened, etc.) to the swirler 74, 1074 to form a subassembly. The subassembly can then be connected to other parts of the engine 10. For example, the dome wall 46 can be connected to the combustor liner 40 and the nozzle 38 can be fixed (e.g., bolted, brazed, welded, riveted, fastened, etc.) to the inner surface 60 of the casing 29.

The term "nozzle" has been used in various ways in the context of gas turbine engines. In the instant application, "nozzle" refers to a component having a portion for fluid coupling to a fuel supply and having at least one portion for fluidly coupling with a combustor cup 31. A distal end of the fuel nozzle 38, 1038 or the nozzle tube 70, 1070 can have nozzle tip 72, 1072 but is not referred to herein as a nozzle itself.

Many other possible aspects and configurations in addition to those shown in the above figures are contemplated by the present disclosure. The aspects disclosed herein can reduce the number of casing holes 76, provide more uniform clamping force between the fuel nozzle 38, 1038 and the casing 29, fix relative positions of the fuel nozzle 38, 1038, the casing 29, and the dome wall 46, and reduce or eliminate the presence of leaking fluid inside the casing 29. The technical effect is that the strength of the casing 29 is increased, stress concentrators (e.g., bolts) can be eliminated, consistent flame distribution is provided, and fluid leaks from the fuel nozzle 38 inside the casing 29 are reduced or eliminated.

Further aspects are provided by the subject matter of the following clauses:

A gas turbine engine comprising: a combustion section enshrouded by a casing having at least one through passage, the combustion section comprising: a dome wall and a liner at least partially defining a combustion chamber; a fuel nozzle connected to the dome wall and having a nozzle tube; and a coupling securing the fuel nozzle with an inner surface of the casing and disposed at least partially in the at least one through passage; wherein the coupling includes a flange disposed at the inner surface of the casing, a first shaft engaged with the flange, and a second shaft disposed at least partially around the first shaft and engaged with the flange.

The gas turbine engine of any preceding clause, wherein the fuel nozzle is rigidly fixed to the inner surface of the casing by the coupling and rigidly fixed to the dome wall.

The gas turbine engine of any preceding clause, wherein the first shaft includes a first fluid passage, the flange includes a second fluid passage fluidly coupled with the first fluid passage, and the nozzle tube includes a third fluid passage fluidly coupled with the second fluid passage.

The gas turbine engine of any preceding clause, wherein the first shaft and the second shaft extend into the through passage.

The gas turbine engine of any preceding clause, wherein the coupling includes a nut disposed at an outer surface of the casing and engaged with the second shaft.

The gas turbine engine of any preceding clause, wherein the flange is engaged with a threaded surface of the second shaft.

The gas turbine engine of any preceding clause, wherein an axial surface of the first shaft includes a formation engaged with a corresponding formation of an axial surface of the flange.

The gas turbine engine of any preceding clause, wherein the first shaft includes a first fluid passage, the flange includes a second fluid passage fluidly coupled with the first fluid passage, and the nozzle tube includes a third fluid passage fluidly coupled with the second fluid passage.

The gas turbine engine of any preceding clause, wherein the first shaft, the second shaft, and the flange at least partially define a leak path providing fluid communication from inside the coupling to a space outside of the casing.

The gas turbine engine of any preceding clause, wherein the leak path includes a leak channel of the first shaft, a leak channel of the second shaft, or both; and wherein the leak path includes a radial gap between the first shaft and the second shaft.

The gas turbine engine of any preceding clause, wherein the coupling includes a first seal disposed in a first seal recess of the flange, and a second seal disposed in a second seal recess of the flange; wherein the flange includes a channel disposed radially between the first seal recess and the second seal recess; and wherein a portion of the second shaft is disposed in the channel.

The gas turbine engine of any preceding clause, wherein the coupling includes a nut disposed at an outer surface of the casing; wherein the coupling includes a third shaft disposed at least partially around the second shaft; and wherein the third shaft is engaged with the flange and the nut.

The gas turbine engine of any preceding clause, wherein the third shaft includes a threaded surface engaged with the flange and the nut; wherein the second shaft incudes a second shaft threaded surface engaged with the flange; and wherein portions of the second shaft and the third shaft are disposed in a channel of the flange.

The gas turbine engine of any preceding clause, wherein the first shaft, the second shaft, the third shaft, and the nut include flat portions disposed outside of the casing.

A fuel nozzle assembly for a gas turbine engine, the fuel nozzle assembly comprising: a first shaft including a first fluid passage; a flange connected to the first shaft and including a second fluid passage fluidly coupled with the first fluid passage; a nozzle tube connected to the flange and including a third fluid passage fluidly coupled with the second fluid passage, the nozzle tube disposed at a first side of the flange; a second shaft connected to the flange, the first shaft disposed at least partially in the second shaft; and a nut disposed at a second side of the flange, the second side opposite the first side.

The fuel nozzle assembly of any preceding clause, wherein the flange, the first shaft, and the second shaft at least partially define a leak path.

The fuel nozzle assembly of any preceding clause, wherein the leak path includes: a radial gap between the first shaft and the second shaft; and a leak channel in an axial surface of at least one of the first shaft or the second shaft.

The fuel nozzle assembly of any preceding clause, wherein one of the flange or the first shaft includes an axially-extending tooth disposed a recess of the other of the flange and the first shaft.

The fuel nozzle assembly of any preceding clause, wherein the first shaft extends axially beyond the second shaft such that flat portions of the first shaft are not covered by the second shaft.

The fuel nozzle assembly of any preceding clause, further comprising a third shaft disposed at least partially around the second shaft; wherein the first shaft is disposed at least partially in the third shaft; and wherein the second shaft and the third shaft are threadedly engaged with the flange.

The fuel nozzle assembly of any preceding clause, wherein the flange includes a channel having first threaded surface and a second threaded surface disposed at opposite sides of the channel; wherein the second shaft is engaged with the first threaded surface; and wherein the third shaft is engaged with the second threaded surface.

A method of assembling a fuel nozzle assembly in a gas turbine engine including a dome wall and a casing, the fuel nozzle assembly including a flange, a first shaft, a second shaft, a nozzle tube, and a nut, the method comprising: connecting the nozzle tube to the dome wall; inserting the first shaft into a hole of the casing; engaging the first shaft with the flange; inserting the second shaft into the hole of the casing; engaging the second shaft with the flange; engaging the nut with the second shaft or a third shaft of the fuel nozzle assembly; and applying torque to the nut to secure the fuel nozzle assembly with the casing.

The method of any preceding clause, further comprising restricting rotation of the first shaft while engaging the second shaft with the flange; and restricting rotation of the second shaft while engaging the nut, applying torque to the nut, or both.

The method of any preceding clause, wherein restricting rotation of the first shaft includes applying a force or torque to a portion of the first shaft disposed outside of the casing; wherein engaging the second shaft with the flange includes applying a second force or torque to a portion of the second shaft disposed outside of the casing; wherein restricting rotation of the second shaft includes applying a third force or torque to the portion of the second shaft disposed outside of the casing; and wherein the nut is disposed outside of the casing.

The method of any preceding clause, wherein engaging the first shaft with the flange includes inserting, in an axial direction, a tooth of one of the first shaft or the flange into a recess of the other of the first shaft or the flange.

The method of any preceding clause, wherein connecting the nozzle tube to the dome wall includes rigidly fixing the nozzle tube to the dome wall prior to engaging the nut with the second shaft or the third shaft.

The method of any preceding clause, wherein connecting the nozzle tube to the dome wall includes rigidly fixing the nozzle tube to the dome wall prior to inserting the first shaft into the hole.

The method of any preceding clause, further comprising threadedly engaging the third shaft with the flange; wherein the nut is engaged with the third shaft.

The method of any preceding clause, wherein threadedly engaging the third shaft with the flange includes deforming a seal disposed between the flange and an inner surface of the casing.

A hydrogen fuel nozzle assembly for a gas turbine engine, the hydrogen fuel nozzle assembly comprising: a first shaft including a first fluid passage; a flange connected to the first shaft and including a second fluid passage fluidly coupled with the first fluid passage; a nozzle tube connected to the flange and including a third fluid passage fluidly coupled with the second fluid passage; a second shaft connected to the flange, the first shaft disposed at least partially in the second shaft; and a nut connected to the second shaft.

The fuel nozzle assembly of any preceding claim, wherein the nut is disposed outside of the casing, and the flange is disposed inside the casing.

A method of assembling the fuel nozzle assembly of any preceding clause in a gas turbine engine including a dome wall and a casing, the method comprising: connecting the nozzle tube to the dome wall; inserting the first shaft into a hole of the casing; engaging the first shaft with the flange; inserting the second shaft into the hole of the casing; engaging the second shaft with the flange; engaging the nut with the second shaft or a third shaft; and applying torque to the nut to secure the fuel nozzle assembly with the casing.

The method of any preceding clause, further comprising restricting rotation of the first shaft while engaging the second shaft with the flange; and restricting rotation of the second shaft while engaging the nut, applying torque to the nut, or both.

The method of any preceding clause, wherein restricting rotation of the first shaft includes applying a force or torque to a portion of the first shaft disposed outside of the casing; wherein engaging the second shaft with the flange includes applying a second force or torque to a portion of the second shaft disposed outside of the casing; wherein restricting rotation of the second shaft includes applying a third force or torque to the portion of the second shaft disposed outside of the casing; and wherein the nut is disposed outside of the casing.

The method of any preceding clause, wherein engaging the first shaft with the flange includes inserting, in an axial direction, a tooth of one of the first shaft or the flange into a recess of the other of the first shaft or the flange.

The method of any preceding clause, wherein connecting the nozzle tube to the dome wall includes rigidly fixing the nozzle tube to the dome wall prior to engaging the nut with the second shaft or the third shaft.

The method of any preceding clause, wherein connecting the nozzle tube to the dome wall includes rigidly fixing the nozzle tube to the dome wall prior to inserting the first shaft into the hole.

The method of any preceding clause, further comprising threadedly engaging the third shaft with the flange; wherein the nut is engaged with the third shaft.

The method of any preceding clause, wherein threadedly engaging the third shaft with the flange includes deforming a seal disposed between the flange and an inner surface of the casing.

While described with respect to a turbine engine, it should be appreciated that the combustor as described herein can be for any engine with a having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
a combustion section enshrouded by a casing having at least one through passage, the combustion section comprising:
a dome wall and a liner at least partially defining a combustion chamber;
a fuel nozzle connected to the dome wall and having a nozzle tube; and
a coupling securing the fuel nozzle with an inner surface of the casing and disposed at least partially in the at least one through passage;
wherein the coupling includes a flange disposed at the inner surface of the casing, a first shaft engaged with the flange, and a second shaft disposed at least partially around the first shaft and engaged with the flange.

2. The gas turbine engine of claim 1, wherein the fuel nozzle is rigidly fixed to the inner surface of the casing by the coupling and rigidly fixed to the dome wall.

3. The gas turbine engine of claim 1, wherein the first shaft includes a first fluid passage, the flange includes a second fluid passage fluidly coupled with the first fluid passage, and the nozzle tube includes a third fluid passage fluidly coupled with the second fluid passage.

4. The gas turbine engine of claim 1, wherein the first shaft and the second shaft extend into the through passage and are disposed partially outside the casing; and
wherein the second shaft is disposed partially in a space inside the casing.

5. The gas turbine engine of claim 1, wherein the coupling includes a nut disposed at an outer surface of the casing and engaged with the second shaft.

6. The gas turbine engine of claim 5, wherein the flange is engaged with a threaded outer surface of the second shaft;
wherein the nut is engaged with the threaded outer surface of the second shaft; and
wherein a portion of the casing is disposed between the flange and the nut.

7. The gas turbine engine of claim 6, wherein an axial surface of the first shaft includes a plurality of formations engaged with a corresponding plurality of formations of an axial surface of the flange to restrict relative rotation between the first shaft and the flange.

8. The gas turbine engine of claim 6, wherein the first shaft includes a first fluid passage, the flange includes a second fluid passage fluidly coupled with the first fluid passage, and the nozzle tube includes a third fluid passage fluidly coupled with the second fluid passage.

9. The gas turbine engine of claim 6, wherein the first shaft, the second shaft, and the flange at least partially define a leak path providing fluid communication from inside the coupling to a space outside of the casing.

10. The gas turbine engine of claim 9, wherein the leak path includes a leak channel of the first shaft, a leak channel of the second shaft, or both; and
wherein the leak path includes a radial gap between the first shaft and the second shaft.

11. The gas turbine engine of claim 1, wherein the coupling includes a first seal disposed in a first seal recess in an axial surface of the flange and in contact with the first shaft, and a second seal disposed in a second seal recess of the flange and in contact with the inner surface of the casing;
wherein the flange includes a channel disposed radially between the first seal recess and the second seal recess; and
wherein a portion of the second shaft is disposed in the channel.

12. The gas turbine engine of claim 1, wherein the coupling includes a nut disposed at an outer surface of the casing;
   wherein the coupling includes a third shaft disposed at least partially around the second shaft; and
   wherein the third shaft is engaged with the flange and the nut.

13. The gas turbine engine of claim 12, wherein the third shaft includes a threaded surface engaged with the flange and the nut;
   wherein the second shaft incudes a second shaft threaded surface engaged with the flange; and
   wherein portions of the second shaft and the third shaft are disposed in a channel of the flange.

14. The gas turbine engine of claim 12, wherein the first shaft, the second shaft, the third shaft, and the nut include flat portions disposed outside of the casing.

15. A fuel nozzle assembly for a gas turbine engine, the fuel nozzle assembly comprising:
   a first shaft including a first fluid passage;
   a flange connected to the first shaft and including a second fluid passage fluidly coupled with the first fluid passage;
   a nozzle tube connected to the flange and including a third fluid passage fluidly coupled with the second fluid passage, the nozzle tube disposed at a first side of the flange;
   a second shaft connected to the flange, the first shaft disposed at least partially in the second shaft; and
   a nut disposed at a second side of the flange, the second side opposite the first side.

16. The fuel nozzle assembly of claim 15, wherein the flange, the first shaft, and the second shaft at least partially define a leak path.

17. The fuel nozzle assembly of claim 16, wherein the leak path includes:
   a radial gap between the first shaft and the second shaft; and
   a leak channel in an axial surface of at least one of the first shaft or the second shaft.

18. The fuel nozzle assembly of claim 15, wherein one of the flange or the first shaft includes a plurality of axially-extending teeth disposed in a recess of the other of the flange and the first shaft to restrict rotation between the flange and the first shaft.

19. The fuel nozzle assembly of claim 15, wherein the first shaft extends axially beyond the second shaft such that flat portions of the first shaft are not covered by the second shaft.

20. The fuel nozzle assembly of claim 15, further comprising a third shaft disposed at least partially around the second shaft;
   wherein the first shaft is disposed at least partially in the third shaft; and
   wherein the second shaft and the third shaft are threadedly engaged with the flange.

* * * * *